United States Patent [19]

Tsujita

[11] Patent Number: 5,241,379
[45] Date of Patent: Aug. 31, 1993

[54] AUTOMATIC BOWLING SCORING SYSTEM

[75] Inventor: Masahiro Tsujita, Osaka, Japan

[73] Assignee: Telesystems Co., Ltd., Osaka, Japan

[21] Appl. No.: 866,137

[22] Filed: Apr. 9, 1992

[51] Int. Cl.[5] .......................... A63D 5/04; H04N 7/18
[52] U.S. Cl. ................................. 358/93; 340/323 B;
  358/108; 364/410; 364/411; 434/249
[58] Field of Search .............. 358/93, 108; 340/323 B;
  434/249, 252; 273/54 C; 364/410, 411

[56] References Cited

U.S. PATENT DOCUMENTS

| 3,016,812 | 1/1962 | Chatlain | 358/108 |
| 3,252,705 | 5/1966 | Cornberg | 340/323 B |
| 3,408,750 | 11/1968 | McCollough | 434/252 |
| 4,935,721 | 6/1990 | Kato | 340/323 B |
| 4,937,772 | 6/1990 | Chavez | 434/249 |
| 5,101,354 | 3/1992 | Mowers | 340/324 B |
| 5,118,105 | 6/1992 | Brim | 340/324 B |

FOREIGN PATENT DOCUMENTS 58-149782 9/1983 Japan .
61-98272 5/1986 Japan .
63-21081 1/1988 Japan .
3-57469 3/1991 Japan .

*Primary Examiner*—Howard W. Britton
*Attorney, Agent, or Firm*—Graham & James

[57] ABSTRACT

An automatic bowling scoring system comprises the first video camera for taking an image of player's throwing form, the second video camera for taking an image of pins, display means for displaying at least the image of the player's throwing form, the image of the pins and a picture for a game, and game advancing device for advancing the game according to state of a fallen down pin. The picture is a red pin one, a slot machine one, a parcheesi one or the like. With the red pin picture, when a pin corresponding to the red pin picture is fallen down a premium is given to a player. With the slot machine picture, when specified pins are fallen down a slot machine game is started to give a premium to the player. With the parcheesi picture, the parcheesi game is performed for each throwing.

12 Claims, 28 Drawing Sheets

AUTOMATIC BOWLING SCORING SYSTEM

BACKGROUND OF THE INVENTION

1. Background of the Invention

The present invention relates to an automatic bowling scoring system which is capable of automatic processing of scoring.

2. Prior Art

Many bowling systems which have been provided in bowling amusement centers are capable of automatic processing of complicated work, such as scoring and filling in sheets. The bowling system, in general, has pin remainder detection means for detecting the reminder of pins after a bowl is thrown, which is comprised of a video camera and an image processing device. Also, the bowling system has a scoring device for scoring and a console having a display screen displaying the score. That configuration enables players to free from complicated work, such as the scoring. Therefore, the players can be devoted to the bowl throwing, thereby service to the players being improved.

In addition, there have been the bowling amusement centers which adopt the red pin services for the players. The red pin service is a service in which a red pin is previously set in an automatic pin setting device. If a player can succeed in knocking down the red pin, the player can get a specified premium, such as goods and discount. The red pin service is generally performed on the predetermined date. The red pin is set in the pin holding portion of the automatic pin setting device by manual operation before opening time of each day. If the red pin appears after the setting of the red pin, the player calls a worker of the bowling amusement center, who usually stands in the front desk to be checked whether the red pin has fallen down after the player rolls the ball. If the red pin is fallen down, the premium is given to the player at the time or after the playing, or the price for the playing is discounted.

However, the above mentioned services to the players are limited in gathering customers, so more effective ways have been required. The conventional red pin service needs manual operation to set the red pin, and the worker of the bowling amusement center must check by himself at the player's lane whether the red pin is fallen down or not.

SUMMARY OF THE INVENTION

It is therefore an object of the present invention to provide an automatic bowling system having a game function.

It is another object of the present invention to provide an automatic bowling system which processes automatically the game function according to a score.

In accordance with the present invention, an automatic bowling scoring system comprises the first video camera for taking an image of player's throwing form, the second video camera for taking an image of pins, display means for displaying at least the image of the player's throwing form, the image of the pins and a picture for a game, and game advancing device for advancing the game according to state of a fallen down pin. The picture is a red pin one, a slot machine one, a parcheesi one. The system includes a host computer and a plurality of consoles connected to the host computer, each of which is provided for each lane. The game is performed for each lane and payment calculation for all players is performed in the host computer.

DETAILED DESCRIPTION OF THE PREFERRED EMBODIMENTS

Figure 1:
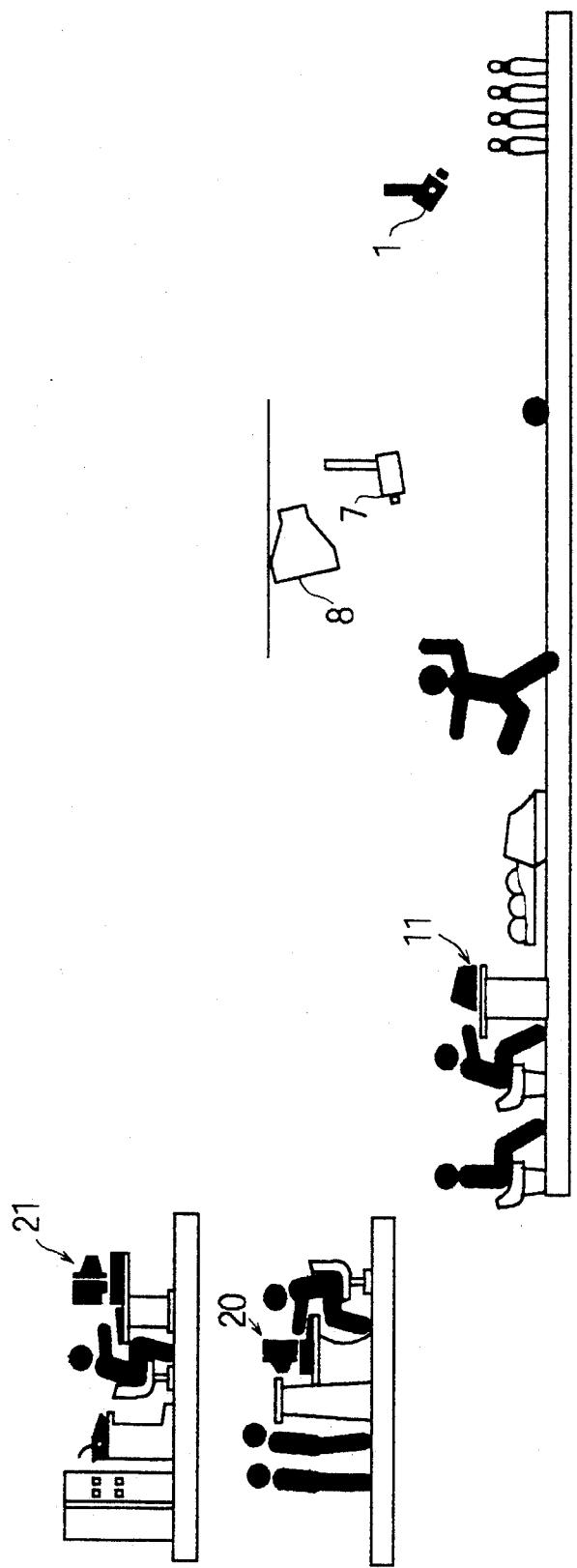
FIG. 1 is a schematic arrangement of an automatic bowling scoring system embodying the present invention.

FIG. 1 is a schematic arrangement of an automatic bowling scoring system embodying the present invention.

A console 11 is connected to host computers 20, 21 which are provided on a front desk. Customers' names are inputted into the host computer 20. The customers' names inputted into the host computer 20 are sent to the console 11 of a specified lane. A video camera 7 and a CRT 8 are provided above the console 11. The video camera 7 serves for picking up moving images of throwing form of a player. The CRT 8 serves for displaying scores or the like on the screen thereof.

A smaller CRT is provided on the console 11, which displays the same image as the CRT 8. An image of whole pins is picked up by a video camera 1. The video camera 1 can also pick up the image of the remainder of the pins. The host computer 21 is connected to the host computer 20, which serves for processing various data. The host computer 20 is provided with a printer for printing the scores.

Figure 2:
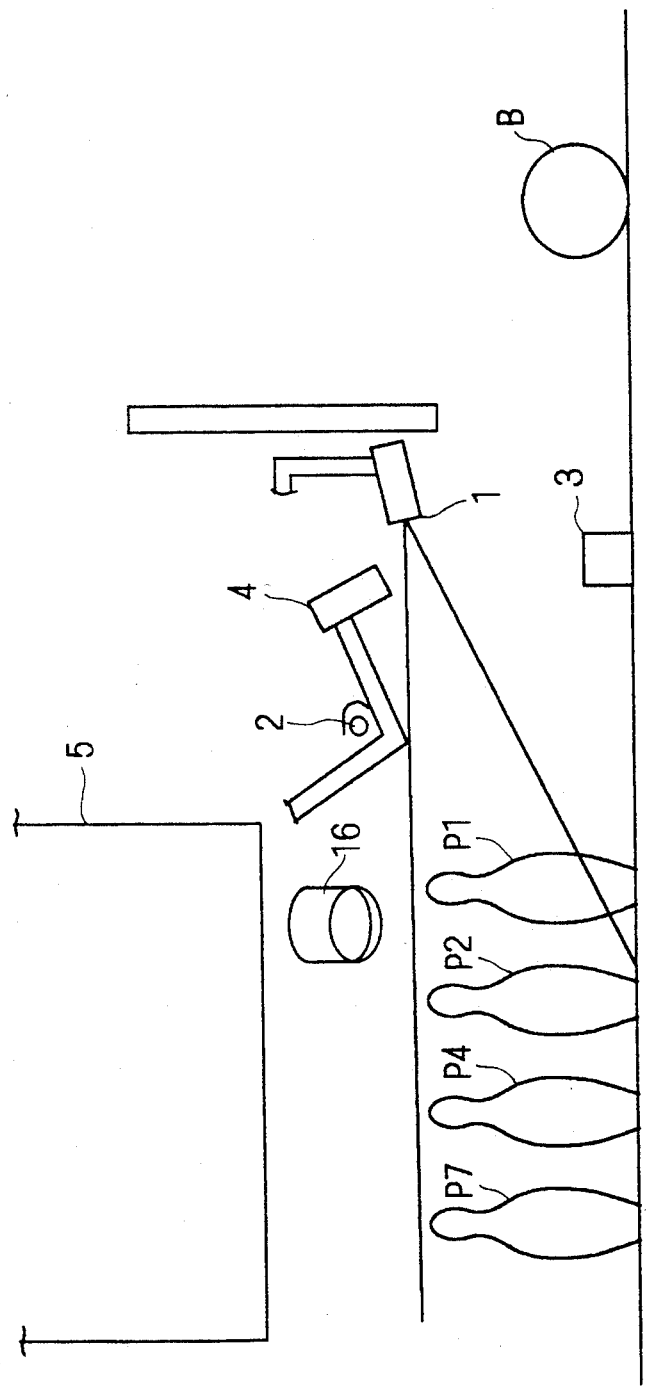
FIG. 2 shows an arrangement near the pins.

FIG. 2 shows an arrangement near the pins.

A pin P1 is the first pin. A rake 4 and a pin-deck 5 serve for removing the fallen pins and resetting the remainder of the pins. A light 2 serves for lighting the pins below the pin-deck 5. The video camera 1 serves for picking up the image of the pins. Two spot lights 16 serve for lighting the first pin P1 with red light. The spot lights 16 are activated during a red pin service frame. A photoelectric switch 3 is provided at a location where a ball B and the rake 4 interrupt the light.

Figure 3:
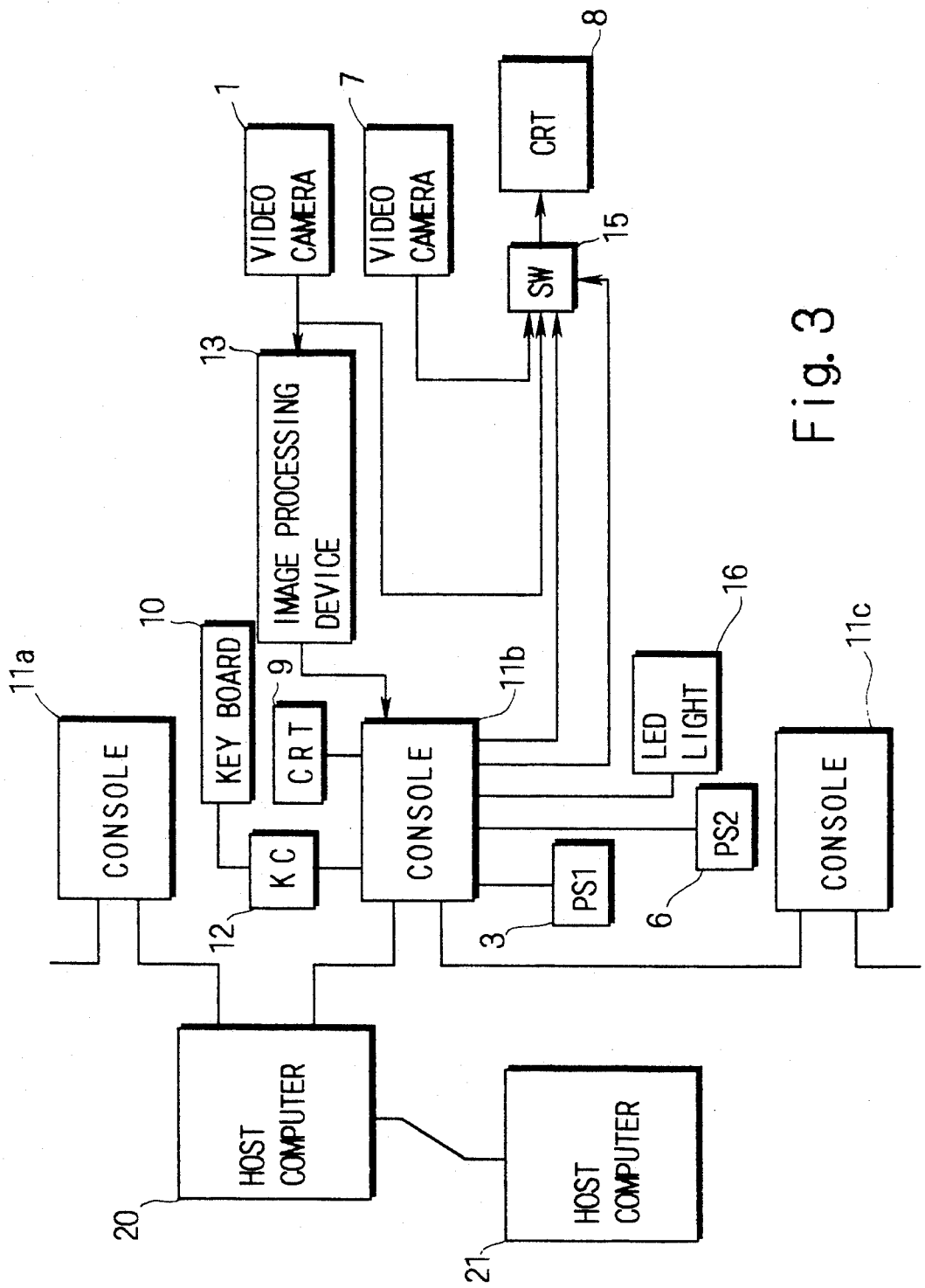
FIG. 3 is a block diagram of the automatic bowling scoring system.

FIG. 3 is a block diagram of the automatic bowling scoring system.

As shown in the figure, a plurality of consoles, 11a, 11b, 11c are connected to the host computer 20 through a LAN (Local Area Network). Each console organized by a microcomputer is provided with a ROM for storing a control program, a RAM employed as a working area, a display memory for storing display data, input and output ports, and so on. These consoles are connected to the following devices.

The console's panel is provided with a small CRT 9 and a keyboard 10. The number 12 shows a controller of the keyboard 10. An image processing device 13 processes image output signals from the video camera 1 and detects pins which have stood. The number 15 denotes a switch for switching an output signal of the video camera 1, an output signal of a video camera 7, and an output signal of the console. The CRT 8 displays a pin action from the signal of the video camera 1, throwing form from the signal of the video camera 7, and scoring information from the console 11. The number 3, 6 are photoelectric switches. The photoelectric switch 3 detects the ball running and the rake working. The photoelectric switch 6 is provided on a foul line for detecting a foul of a player. The number 16 denotes the red spot light for letting the first pin red appearance during the red pin service frame. Each of the consoles serves for controlling two lanes.

Figure 6:
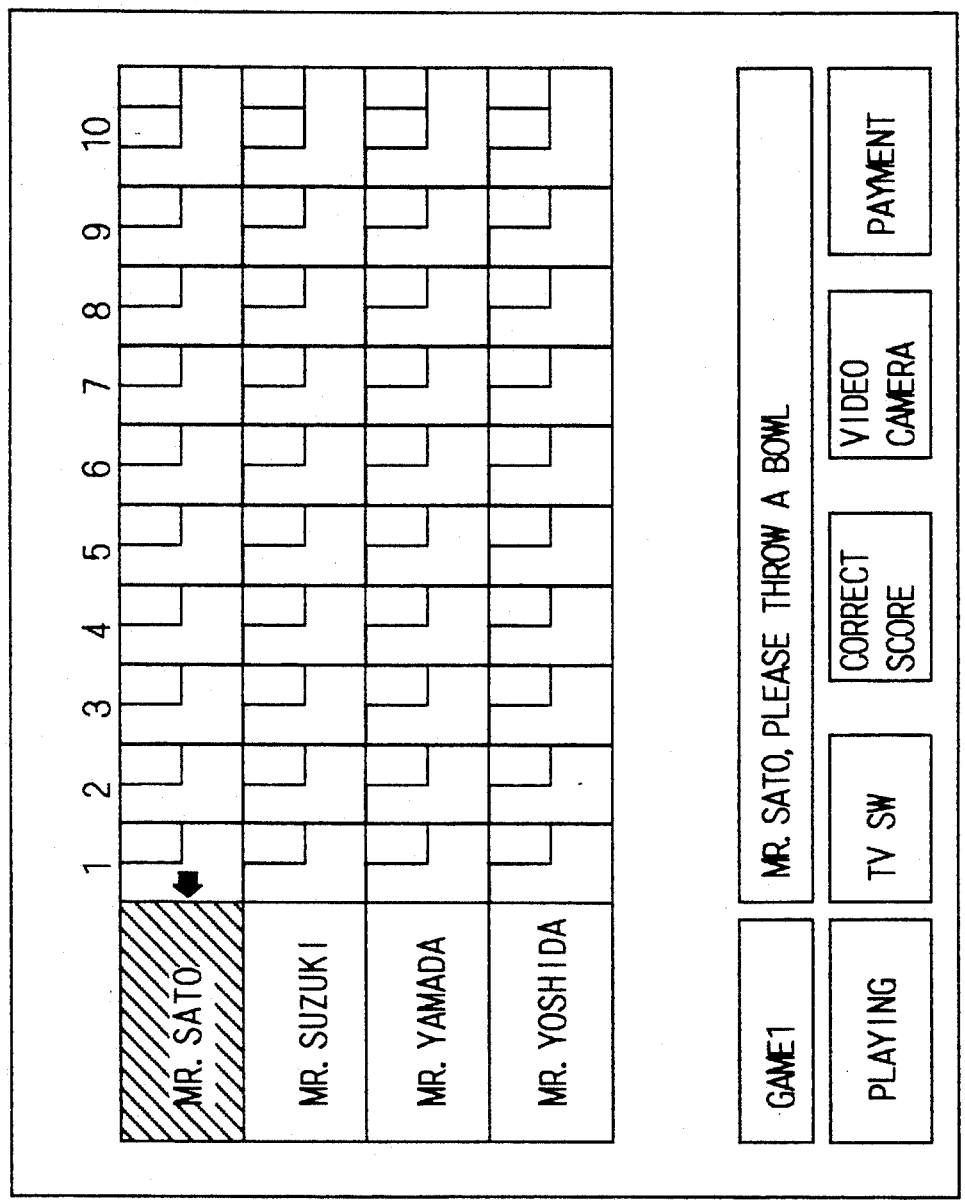
FIGS. 6 to 10 show examples of display.
Figure 7:
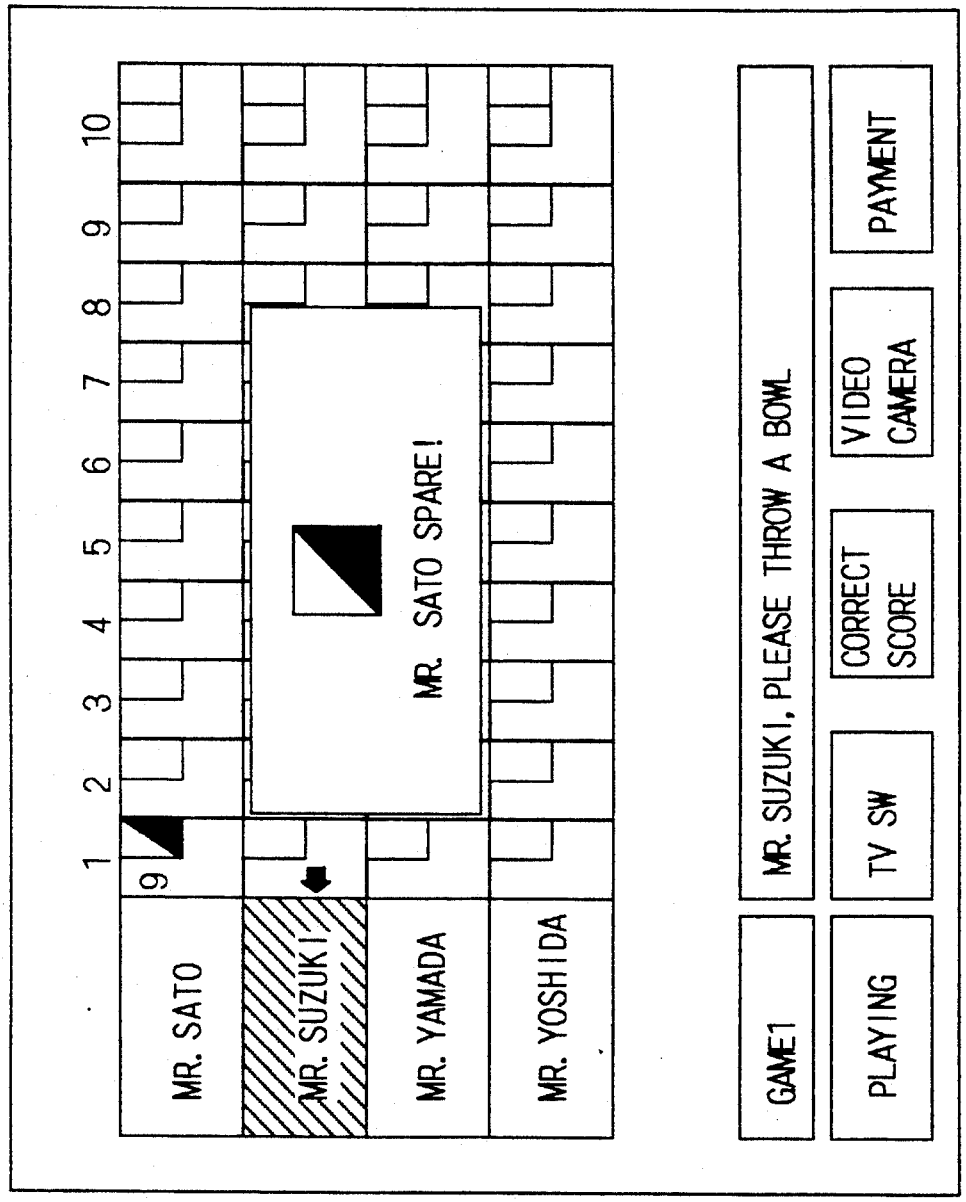
Figure 8:
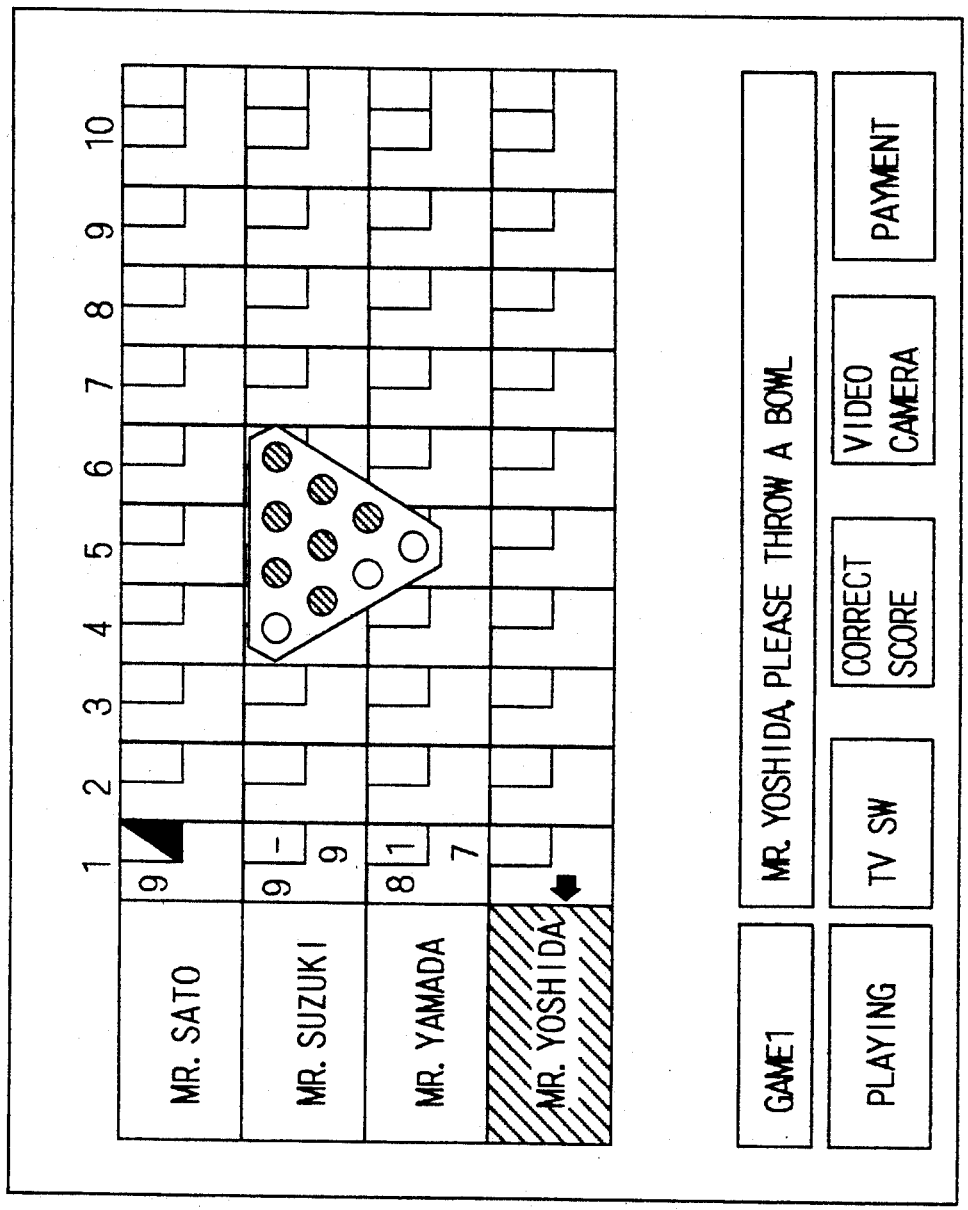

FIGS. 6 to 10 show display examples of the CRT. Bowler's names sent from the host computer in the front desk are displayed as shown in FIG. 6 at the time of the game start, and the bowler's name who should play now is designated by an arrow. After the throwing, marks as shown in FIGS. 7, 8 are displayed on the CRT screen according to the result of the throwing. Also, if the frame becomes to the red pin service frame, the ten pins including the red pin (the first pin) are displayed on the CRT screen. Then if the strike bowl occurred in the red pin service frame, the strike mark and a specified message are displayed on the CRT screen.

FIGS. 4(A) to (C) and 5 are flow charts showing processes of the microcomputer of the console 11 and the host computer 20.

Figure 4:
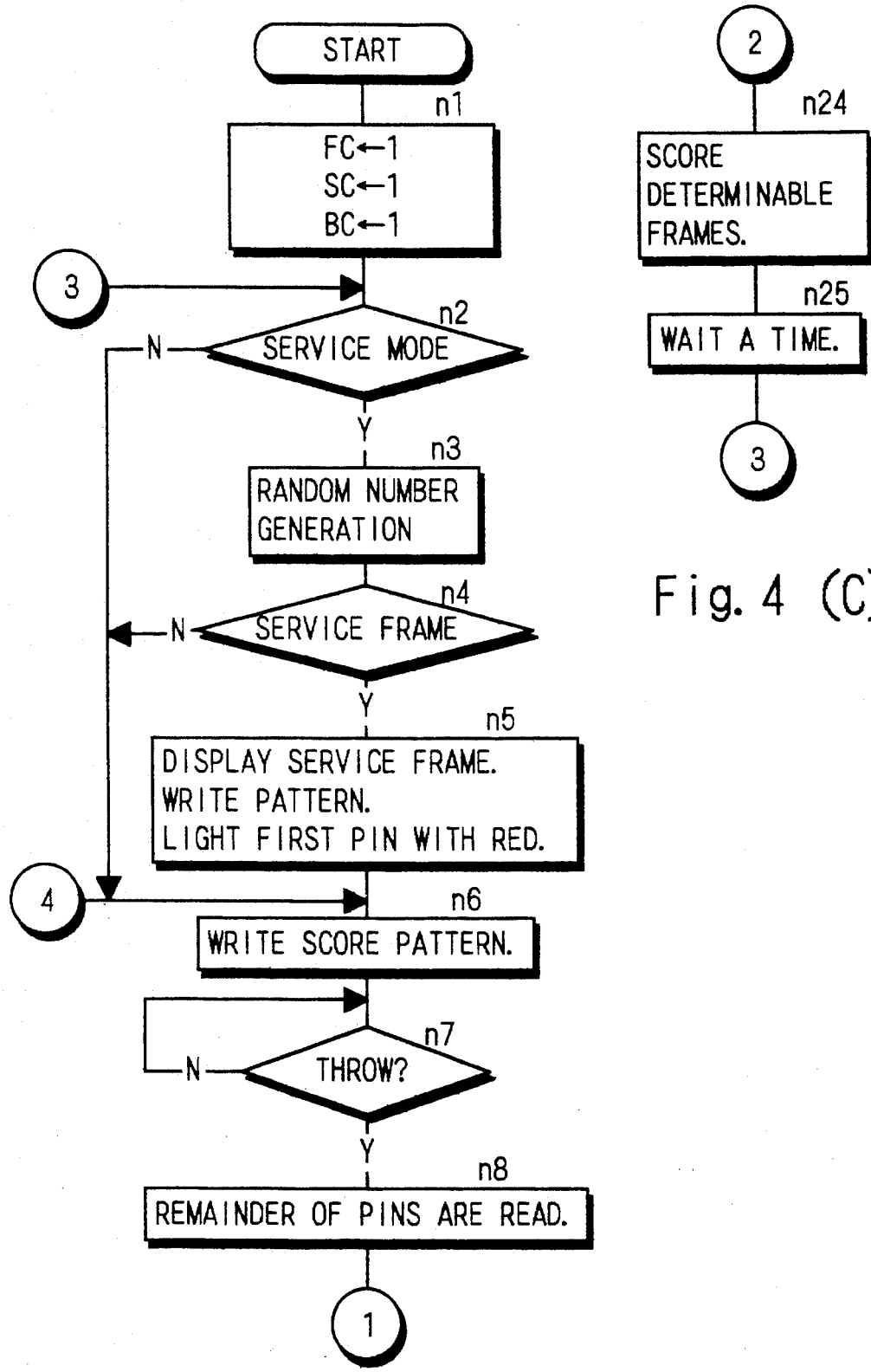
FIGS. 4(A) to 4(C) and 5 are flow charts showing processes of a microcomputer of a console and a host computer.
Figure 4:
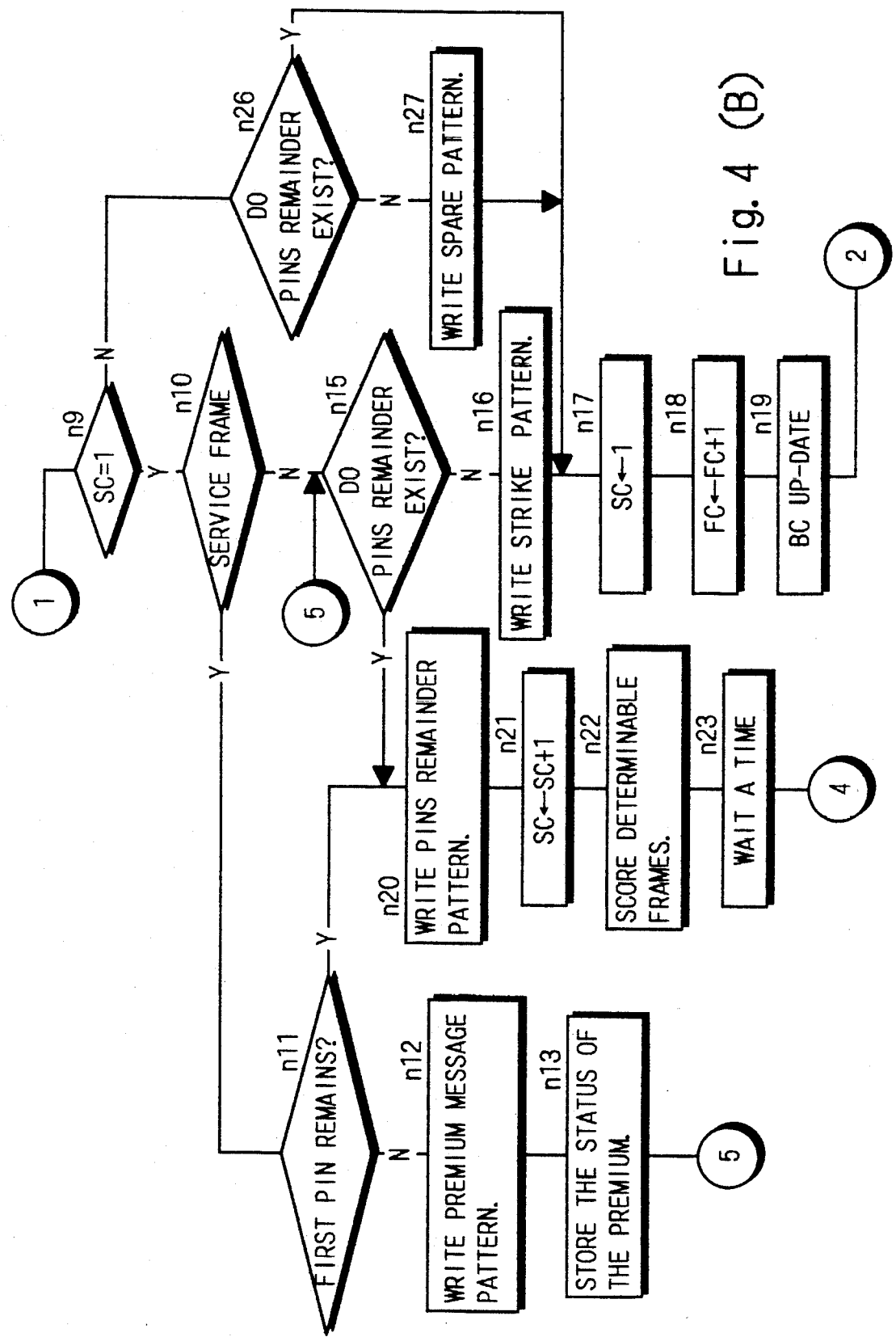
Figure 5:
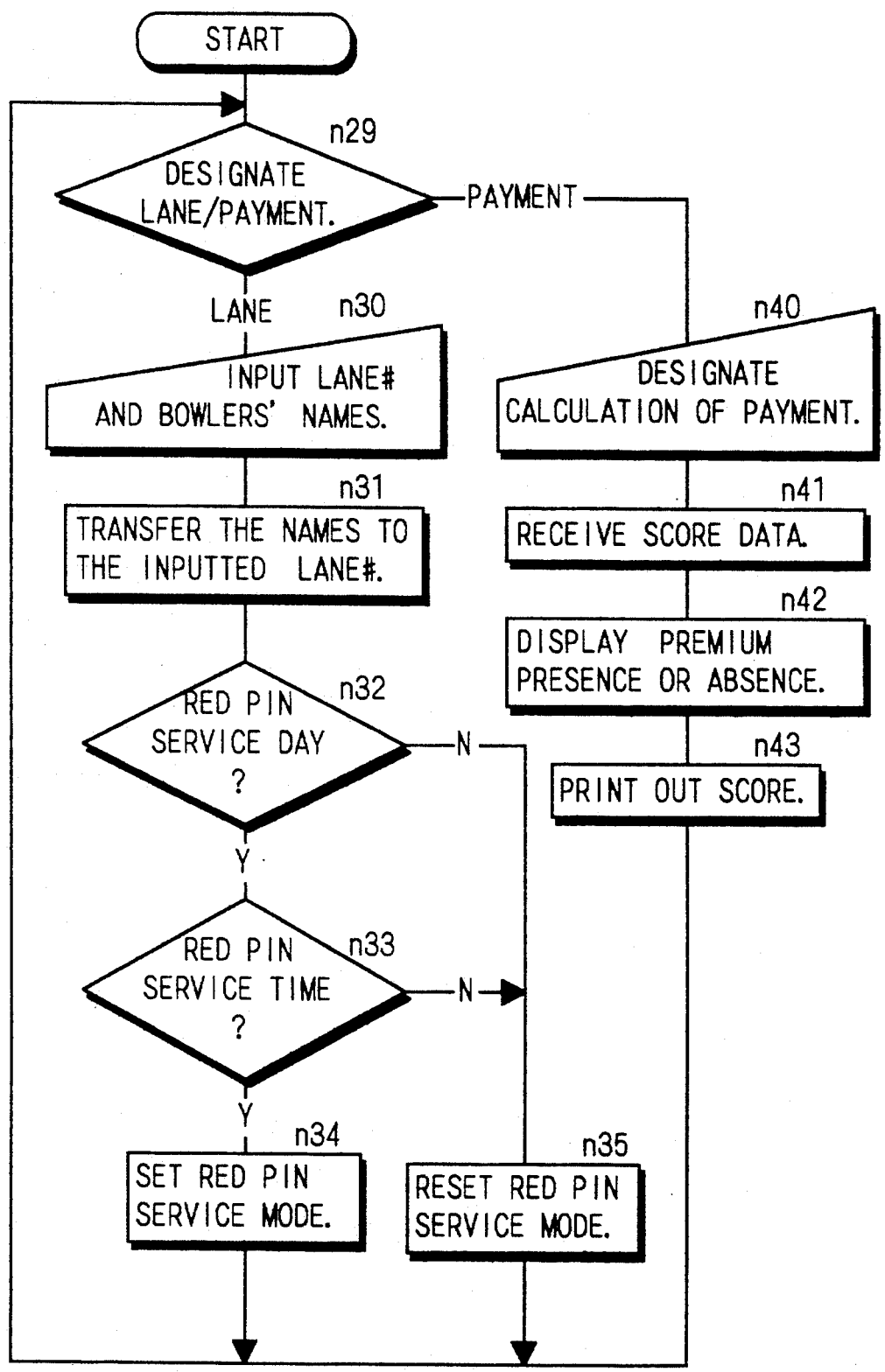
Figure 9:
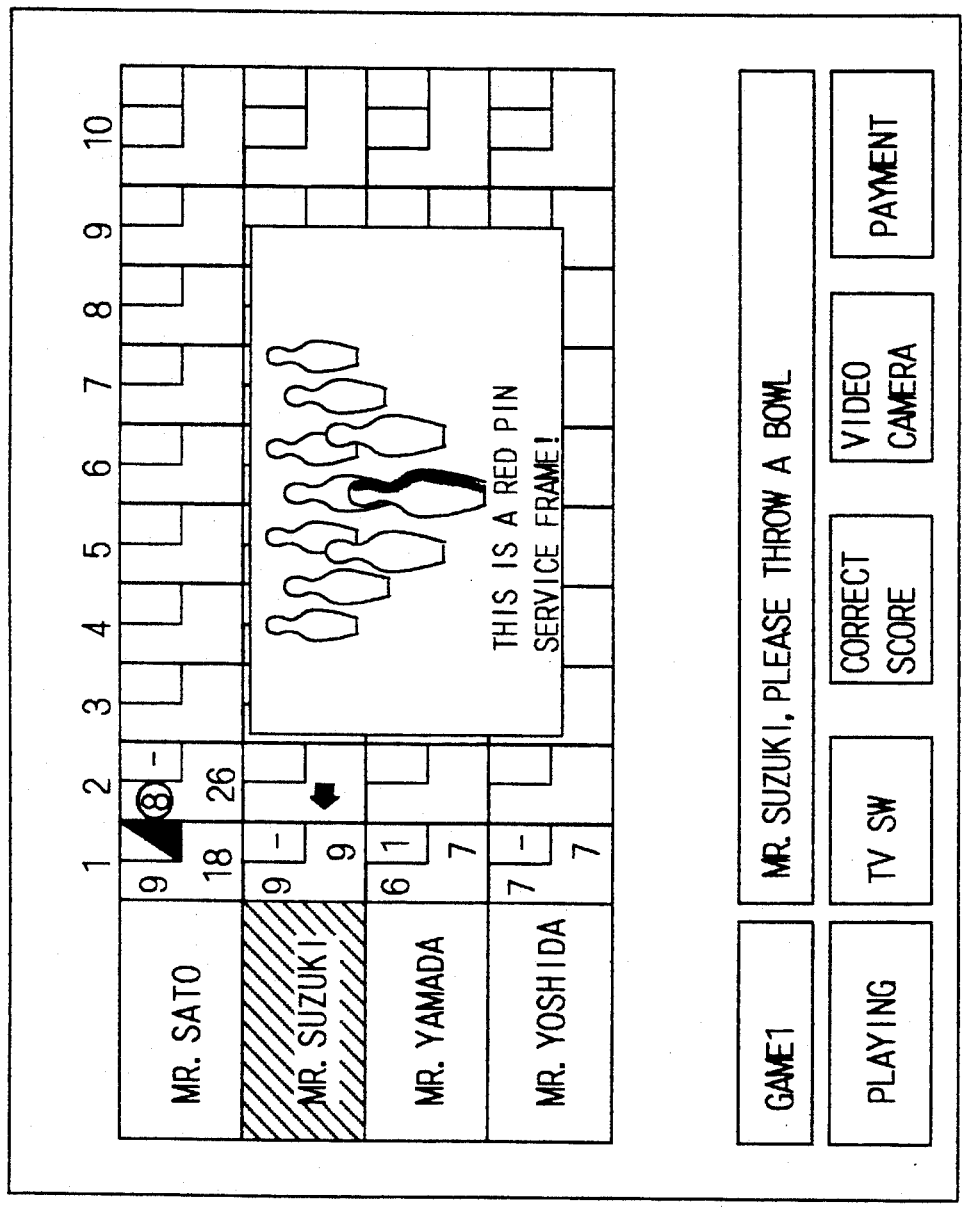
Figure 10:
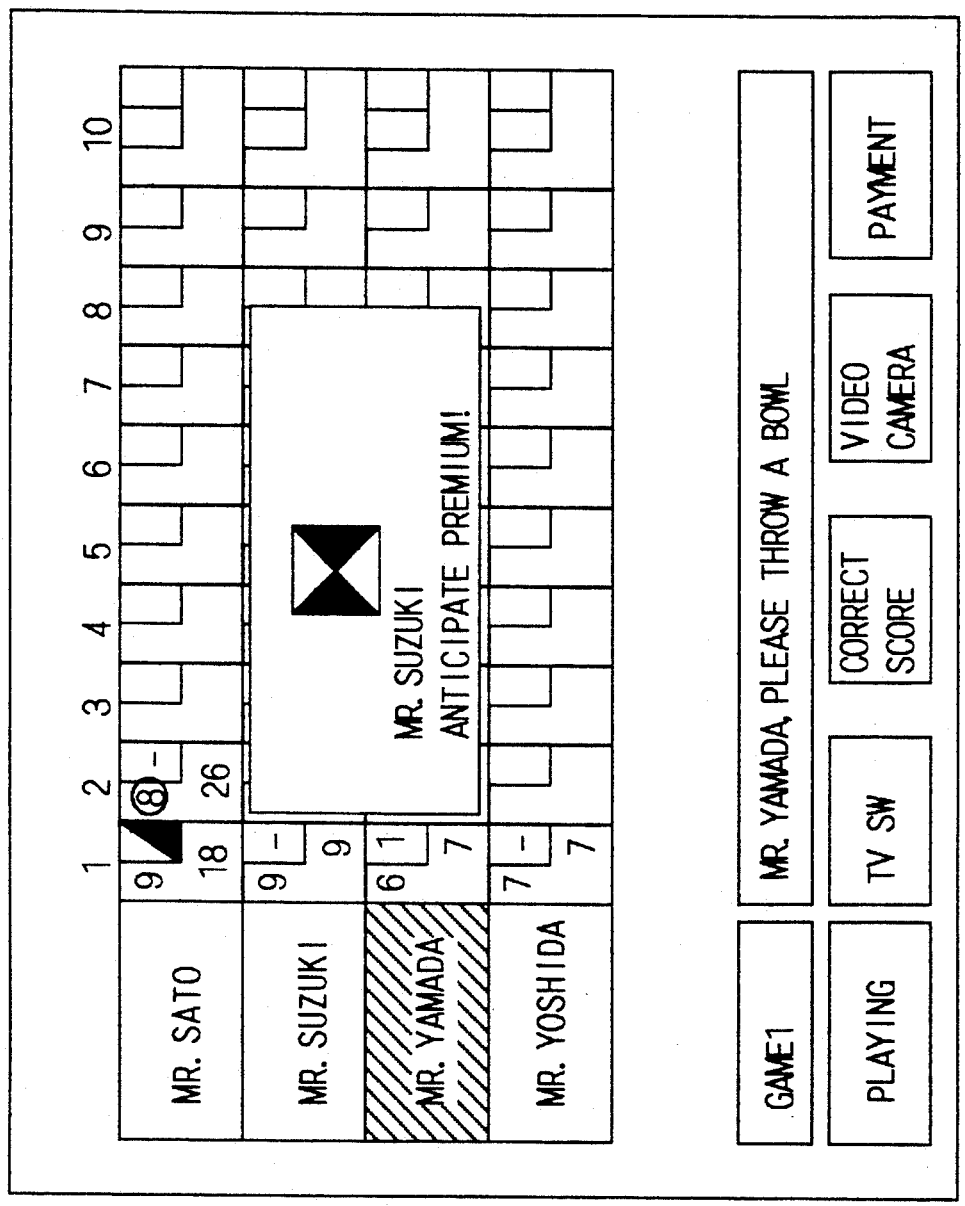

The microcomputer in the console 11 makes a frame counter FC, a throwing counter SC, and a bowler No. counter BC initialize as shown in FIG. 4 (n1). After that, if the lane service is in a service mode which is set by the host computer described later, a random number is generated (n2. n3). If the generated random number is a predetermined value, the present frame is defined as the red pin service frame. In this red pin service frame, the display pattern of the pins including the red pin and the massage as shown in FIG. 9 is stored in a display memory, and the red spot light 16 is activated to make the first pin red (n4, n5). Also, the display pattern for displaying the score is stored in the display memory to display the score (n6). While any frame service other than the red pin service is selected or the generated random number is not the specified value in the red pin service frame, the above process is not performed (n2 to n6 and n4 to n6). At the step n7, the process is in status of waiting for any throwing. If the photoelectric switch 3 detects a threw bowl, the remainder of the pins are counted by the process of the video camera 1 and the image processing device 13 (n7, n8). If SC=1 in the red pin service frame, i.e., the first pin is fallen down in the first throw, the display pattern including the massage for the premium is stored in the display memory, and the status thereof is stored (n9, n10, n11, n12, n13). If the present frame is not the red pin service frame, the remainder of the pins are detected, and if all pins are fallen down, the display pattern for indicating a strike occurrence is stored in the display memory (n15, n16). If SC=2, i.e., if there is no remainder of the pins in the second throw, the display pattern including the massage of a spare occurrence is stored in the display memory as shown in FIG. 7 (n26, n27). After that, the throw counter SC is set to "1", the frame counter is incremented, and the bowler No. counter BC is up-dated (n17, n18, n19). Next, the score in the determinable frame is calculated, and returns to the step n2 after a specified time is elapsed (n24, n25, n2).

If SC=1 and there is the remainder of the pins in the normal pin service frame, the display pattern for displaying the remainder as shown in FIG. 8 is stored in the display memory, and the throw counter SC is incremented (n15, n20, n21). After that, the score in the determinable frame is calculated, and the process from the step n6 is performed after the specified time elapses (n22, n23, n6, . . . ).

While, if the lane number and the bowler's names are inputted in the host computer 20, it transfers the bowler's names to the designated lane (n29, n30, n31). Then if the present day is in the red pin service day and the present time is in the red pin service time, the red pin service mode is set in the designated console (n32, n33, n34). Otherwise, the red pin service mode is canceled (n35). If the calculation for the payment is designated, the score data is read from the corresponding lane (n40, n41). If the score data includes premium data, the premium data is displayed and the score is printed (n42, n43).

As described above, the red pin service is electrically and automatically performed. Therefore, it is unnecessary to set and remove the actual red pin into and from the pin setting device.

In the above embodiment, the first pin is set with certain probability using a random number generator as a specified pin, i.e., the red pin. It is possible to set another pin instead of the first pin as the specified pin. Still more, it is possible to set a plurality of pins as the specified pins. In the above embodiment, when the first throw is done, whether the specified pin is fallen down is judged. It is possible to judge whether the specified pin is fallen down when the second throw is done as well as the first throw.

Figure 11:
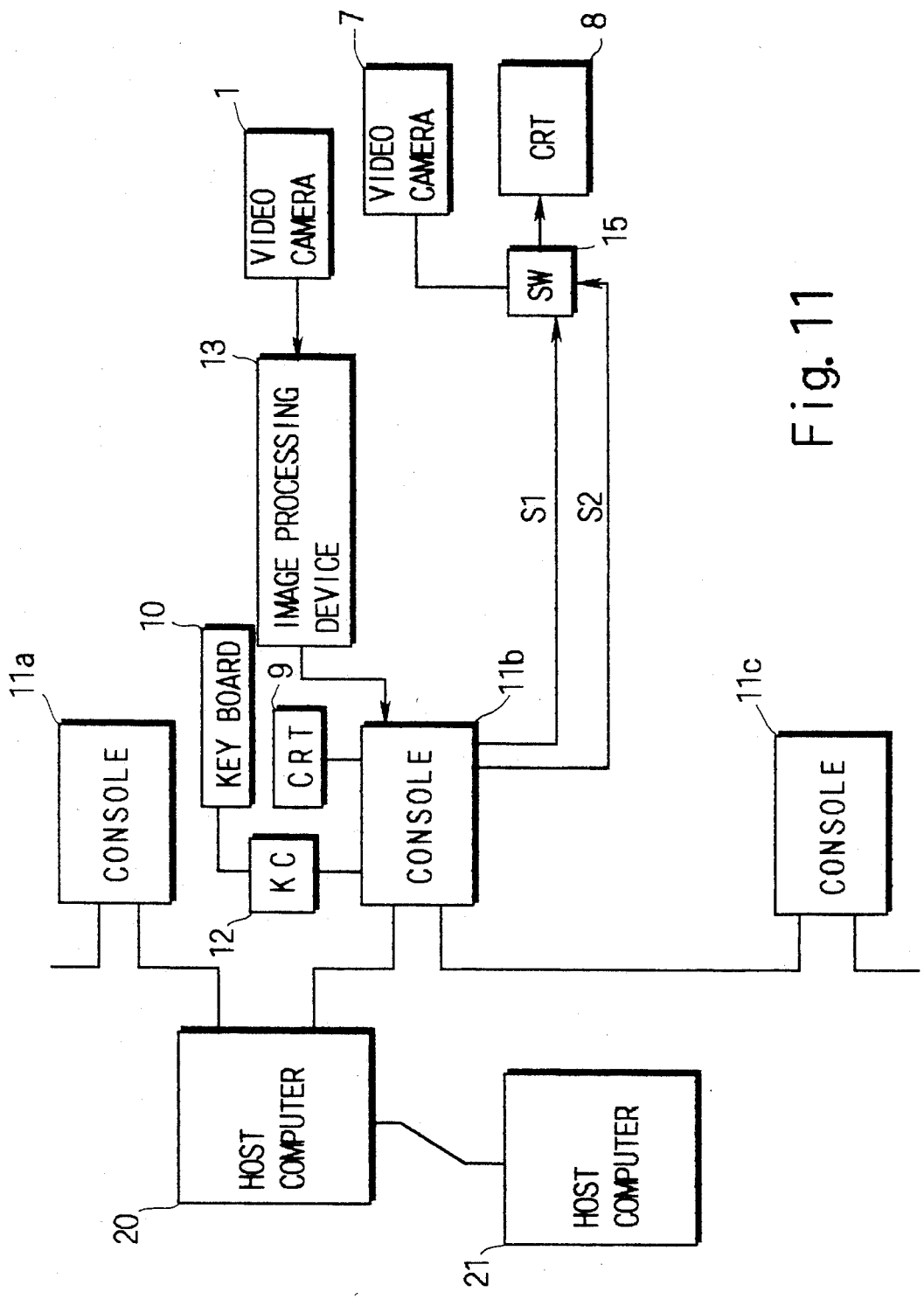
FIG. 11 is a block diagram of another automatic bowling scoring system embodying the present invention.

FIG. 11 is a block diagram of another automatic bowling scoring system embodying the present invention.

In this system, the PS1, PS2, and the red light 16 is not provided compared with the system in FIG. 3. The switch 15 serves for switching the output signal of the video camera 7 and the output signal of the console 11b. The CRT 8 displays usually the score outputted from the console 11b. When the signal S2 is outputted from the console 11b, the image signal of the video camera 7 is outputted to the CRT 8 by switching of the switch 15, thereby the throwing form of the player being displayed on the display screen of the CRT 8.

Figure 12:
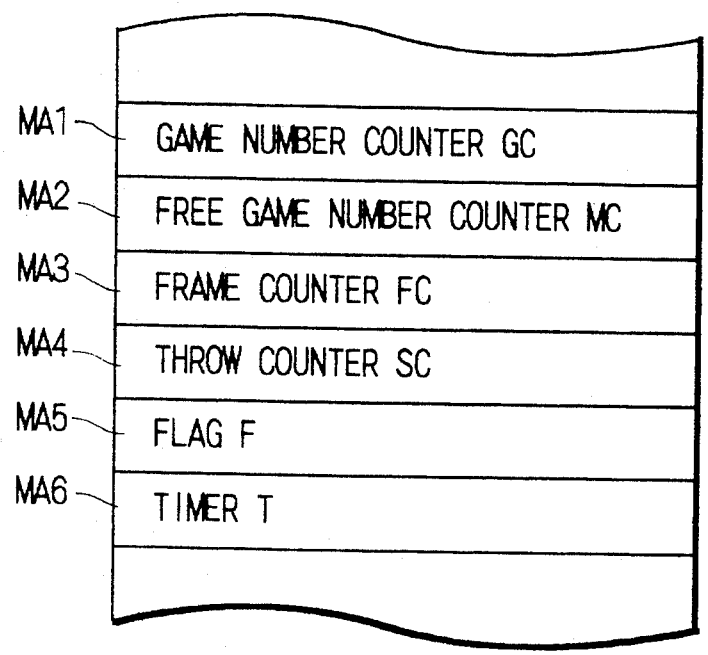
FIG. 12 is a portion of a RAM provided in a control section of a console.

FIG. 12 is a portion of a RAM provided in a control section of the console 11b. The area of the RAM is allocated to the small areas, MA1 to MA6. These areas MA1 to MA6 are respectively, a game number counter GC, a free game number counter MC, a frame counter FC, a throw counter SC, a flag F, and a timer T. The game number counter GC counts the number of games played in a lane. The free gane number counter MC counts the number of free games which are decided by a slot machine game described later. The frame counter FC counts the number of played frames in one game. The throw counter SC counts the number of throwing in each frame. The flag F stores a status of whether the slot machine game results in a free bowling game. The timer T counts a rotation time of a slot in the slot machine game.

Figure 13:
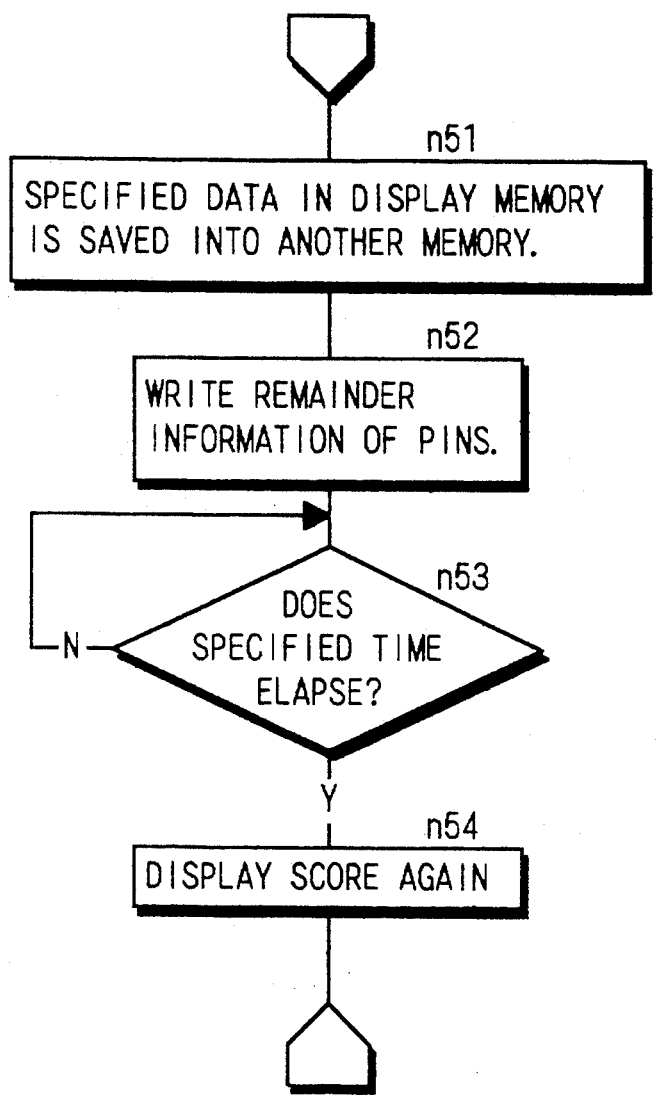
FIG. 13 is a flow chart showing a part of a process of a host computer.

FIG. 13 is a flow chart showing a part of a process of the host computer 20.

First, specified data in a display memory for displaying a score is saved into another memory (n51). Next, data representing the remainder of the pins, data for displaying marks, such as a spare mark and a strike mark, or the like is written into the display memory (n52) to display the remainder of the pins on the displayed score. The display is kept for a specified period, and then the whole score is displayed again (n53, n54).

Figure 14:
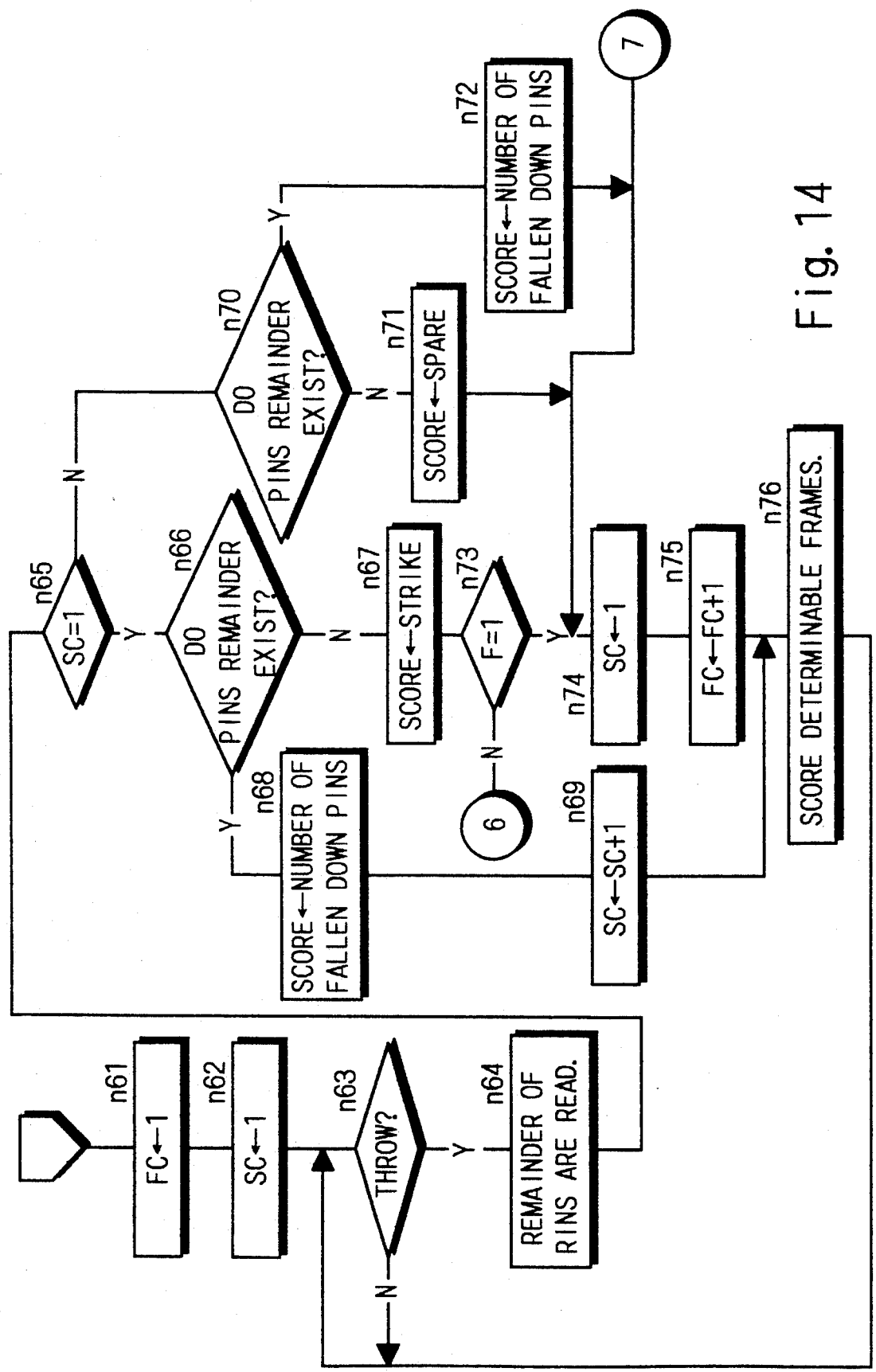
FIGS. 14, 15 are flow charts showing a process of a console.
Figure 15:
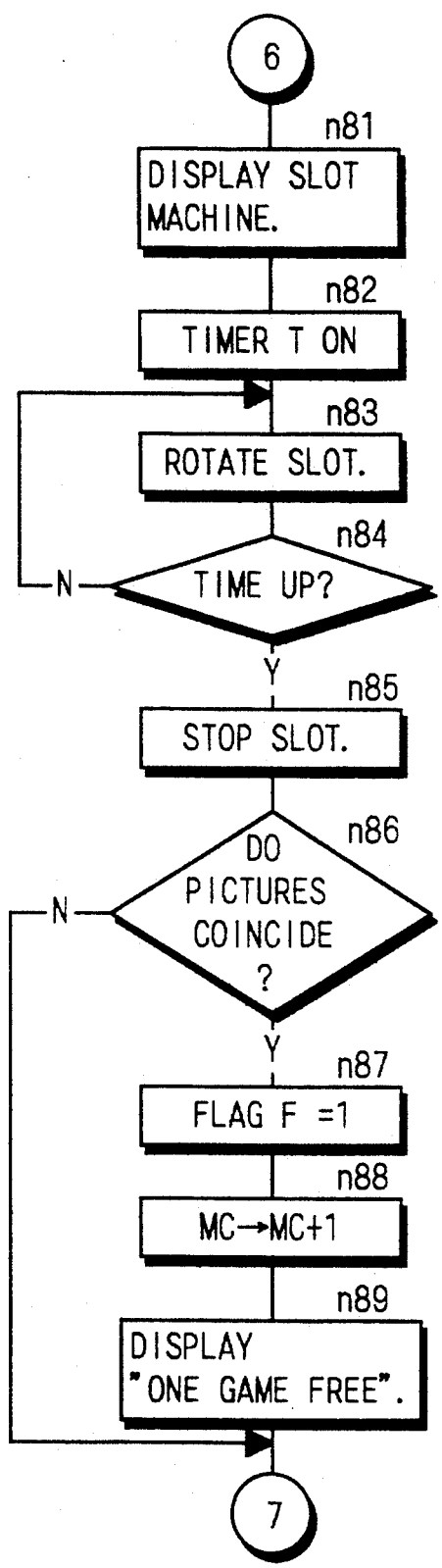

FIGS. 14, 15 are flow charts showing a process of the console of the automatic bowling scoring system. FIG. 14 shows the scoring process and FIG. 15 shows the slot machine game process.

When data is sent from the host computer at the beginning of a game, the score frame is displayed as shown in FIG. 6, and the frame counter FC and the throw counter SC are initialized to wait for a player's throw (n61 to n 63). When the photoelectric switch detects the ball rolled by the player, the remainder of the pins are detected and counted by the image process of the video camera 1 and the image processing device 13 (n64). If the throw counter SC is "1", i.e., the throwing is first, and any pin remains, a scoring process is carried out according to the fallen pins and the throw counter SC is incremented (n65, n66, n68, n69). If the throwing causes determination of the score of the preceding frames, the calculation for the present frame is carried out (n76).

If the frame counter SC is "2", i.e., the throwing is second, and no pin remains, a spare process is carried out (n70, n71). If any pin remains, the scoring process is carried out according to the fell-down pins (n72). After that, the throw counter SC is set to "1" and the frame counter FC is incremented (n14, n15). If the throwing causes determination of the score of the preceding frames, the calculation for the present frame is carried out (n76).

Figure 16:
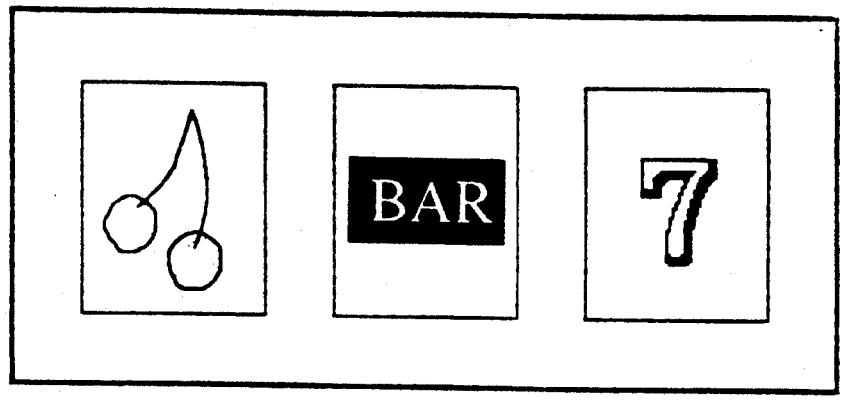
FIGS. 16(A), 16(B) illustrate slot machine pictures.
Figure 16:
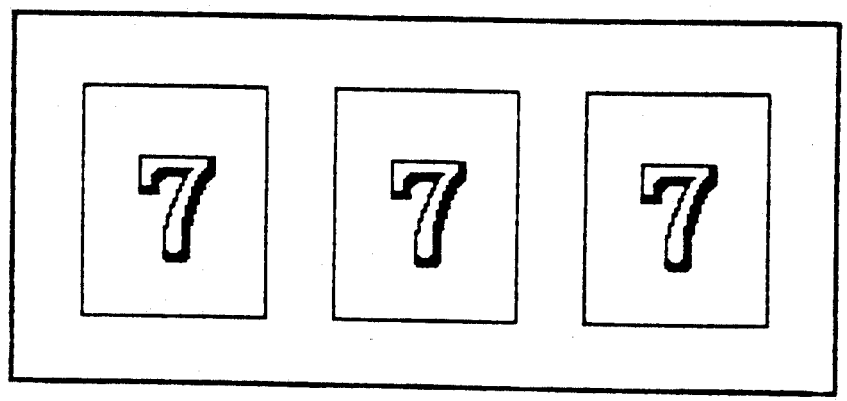

If the throw counter SC is "1", i.e., the throwing is first, and no pin remains, a strike process is carried out (n65 to n67) and the strike mark is displayed on the screen of the display. After that, whether the flag in the area MA5 is set is judged (n13). If the flag is in a reset status, the slot machine game process shown in FIGS. 16 (A), (B) is carried out. That is, a slot machine picture is displayed on the screen of the CRT 8 (n81), and the timer T in the area MA6 is triggered for rotating the slot for a specified period (n82 to n85). If every picture coincides, the flag F is set and the free game number counter MC is incremented (n87, n88). Further, "One game free" is displayed on the screen of the CRT 8 (n89), and the process goes to n74. Therefore, the slot machine game process is performed for every strike process, and if every picture of the slot coincides, one game becomes free.

After the slot machine game process is finished, the throw counter SC is set to "1" and the frame counter FC is incremented for performing the scoring process (n74, n75). If the throwing causes determination of the score of the preceding frames, the calculation for the present frame is carried out (n76).

When the playing is finished, the data in the console is sent to the host computer 20 by operation of a finish key. The free game number counter MC is subtracted from the game number counter GC at the front desk for calculation of the player's payment.

It is possible that the slot is stopped by operation of a player, and also the player's payment is discounted according to the result of the combination of the slot pictures.

Figure 17:
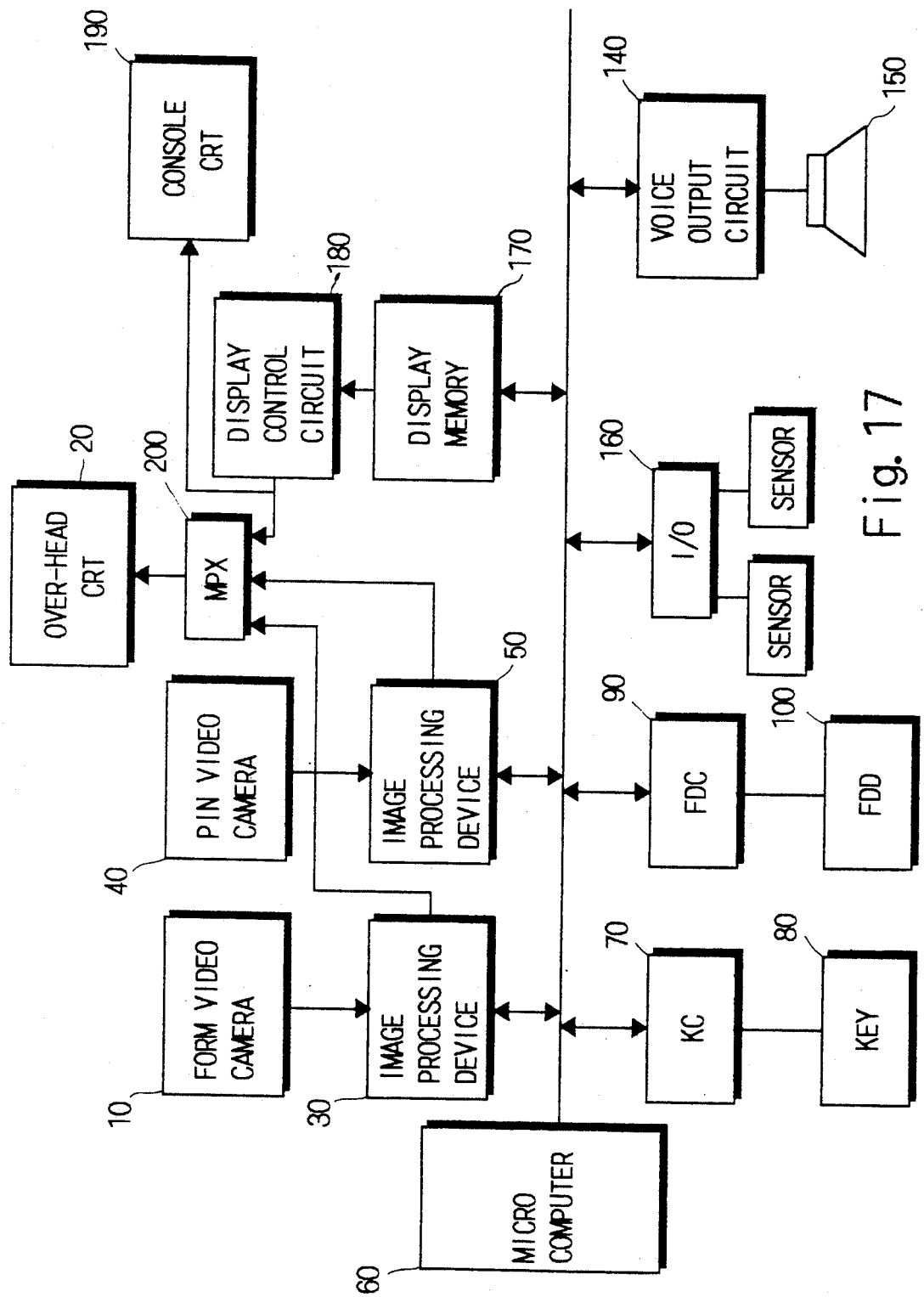
FIG. 17 is a block diagram of another automatic bowling scoring system embodying the present invention.

FIG. 17 is a block diagram of another automatic bowling scoring system embodying the present invention.

In the figure, an image processing device 30 outputs an image signal of a form video camera 10 which takes moving images of throwing form to display the images on a screen of an over-head CRT 20, and processes the image signal. Another image processing device 50 outputs an image signal of a pin video camera 40 to the over-head CRT 20, and detects fell-down pins. A display memory 170 stores display date for the over-head CRT 20 and a console CRT 190. A display control circuit 180 serves for reading successively the data in the display memory 170 and generating image signals. A multiplexer 200 imparts each output signal of the image processing devices 30, 50 and the display control circuit 180 selectively to the over-head CRT 20. Numeral 80 is a keyboard provided in the console, numeral 100 is a floppy disc drive, and numeral 90 is a controller for the floppy disc drive 100. Various sensors such as a bowl pass sensor are connected to an I/O port 160. A voice output circuit 140 drives a speaker 150 to output selectively a plurality of predetermined massages of synthesized tones and a specified effect tone.

Figures 18, 19:
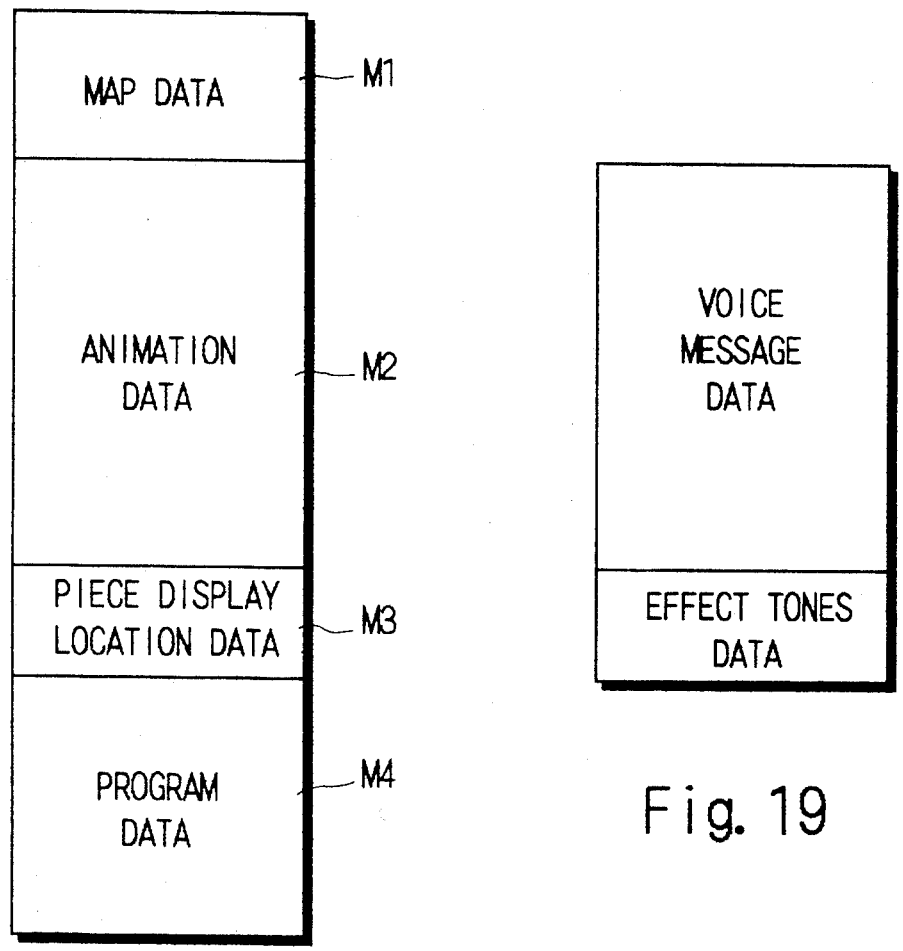
FIG. 18 shows primary data previously written into a floppy disk in a floppy disk drive.
FIG. 19 shows data previously set in a voice output circuit.

FIG. 18 shows primary data previously written into a floppy disk in the floppy disk drive. In this figure, map data M1 is prepared for displaying a map as a background, animation data M2 is prepared for displaying animations, and piece display position data M3 is data for denoting relation between a count value described later and a piece display position to be displayed. Program data M4 is for scoring and advancing a game.

FIG. 19 shows data previously set in the voice output circuit 140. The data includes the message data which is read according to the process of the game, and the effect tone data which is read when the piece is advanced.

Figure 20:
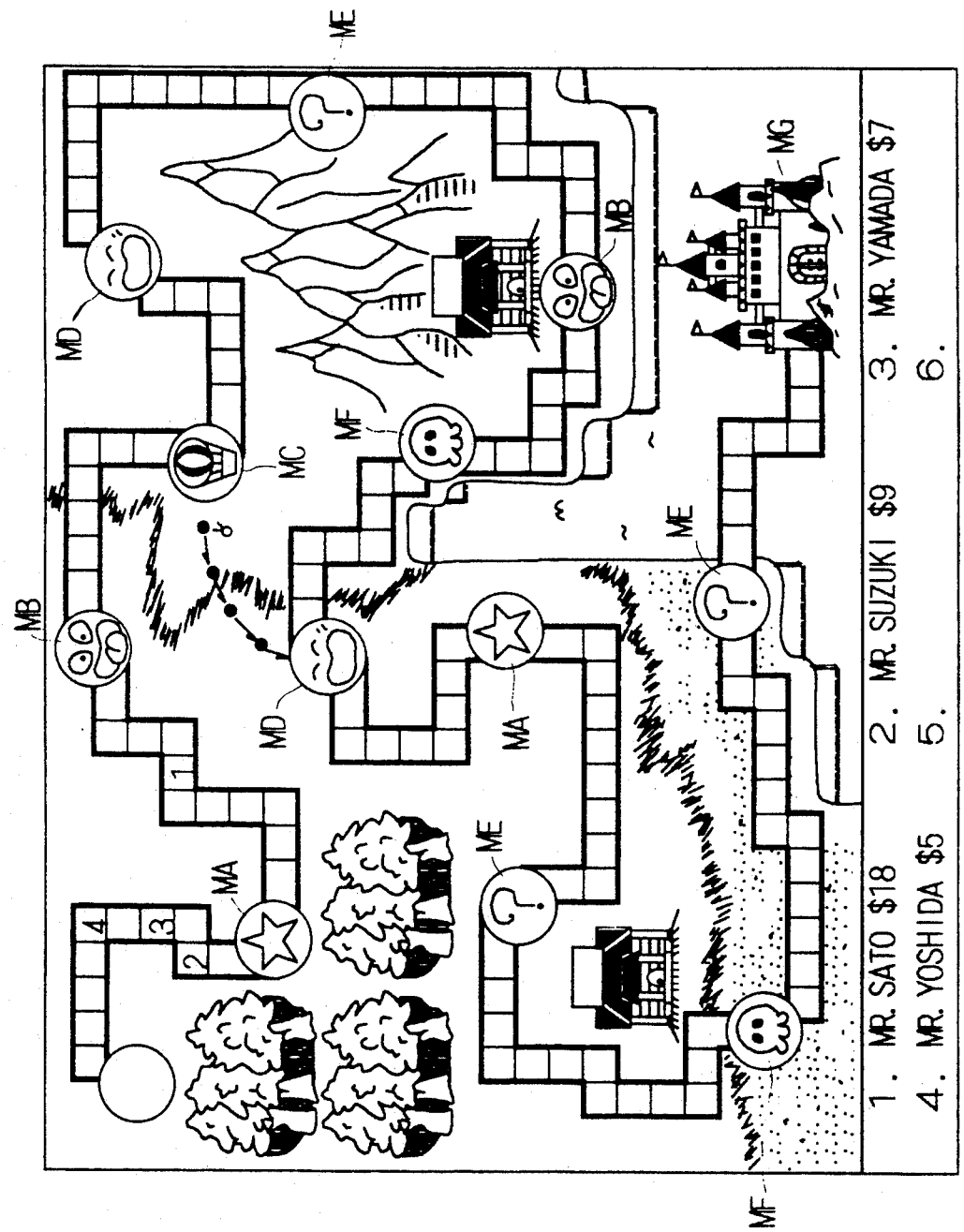
FIGS. 20, 21 and 22(A) to 22(E) show display examples of a game.
Figure 21:
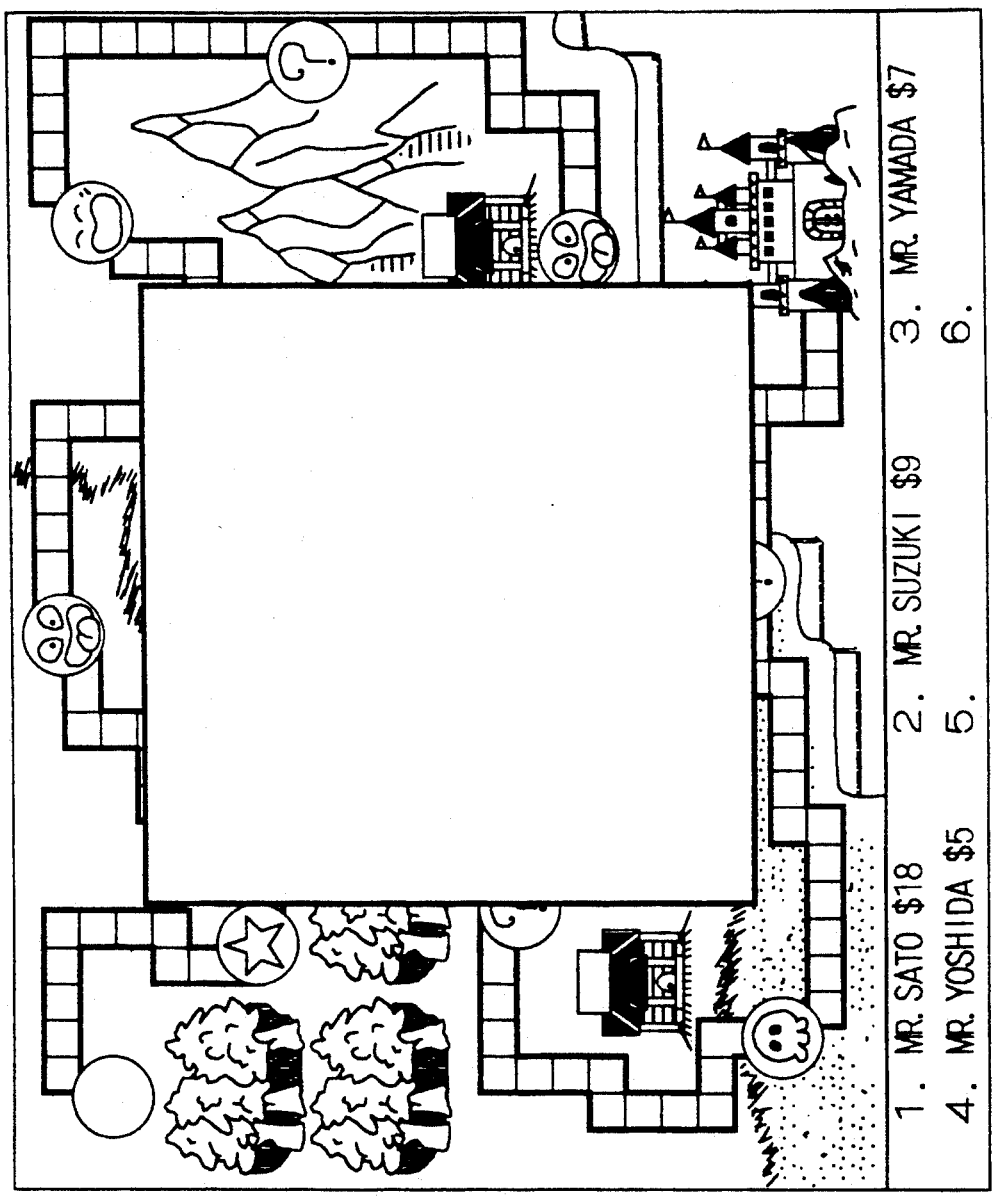
Figure 22:
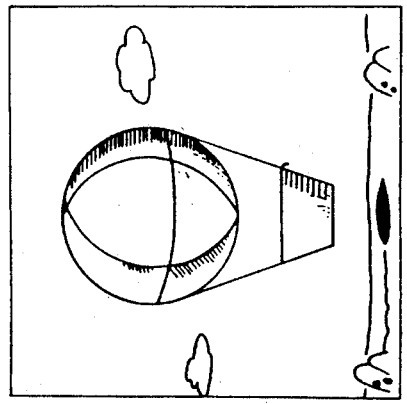
Figure 22:
Figure 22:
Figure 22:
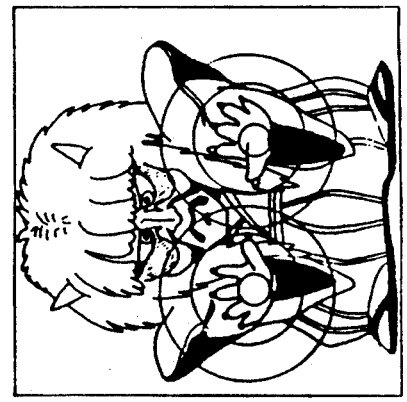
Figure 22:
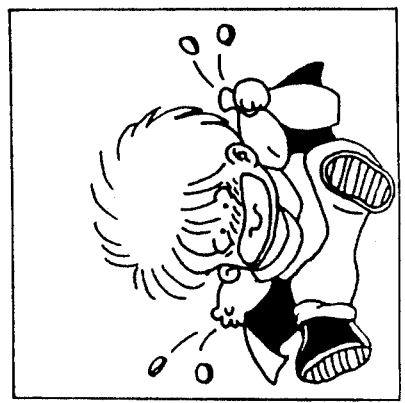

FIGS. 20 to 22 show display examples of the game. FIG. 20 shows an ordinary map, and FIG. 21 shows a display example when each piece comes into a specified position. An animation as shown in FIGS. 22 (A) to (E) is displayed in the square area in FIG. 21. In FIG. 20, the bowlers' numbers, the bowlers' names and the bowlers' money in his hand (each of which enables the sum of small boxes that each piece passed) are displayed below the screen. Each numeral in the small box is the bowler's number and the bowler's piece location.

Figure 23:
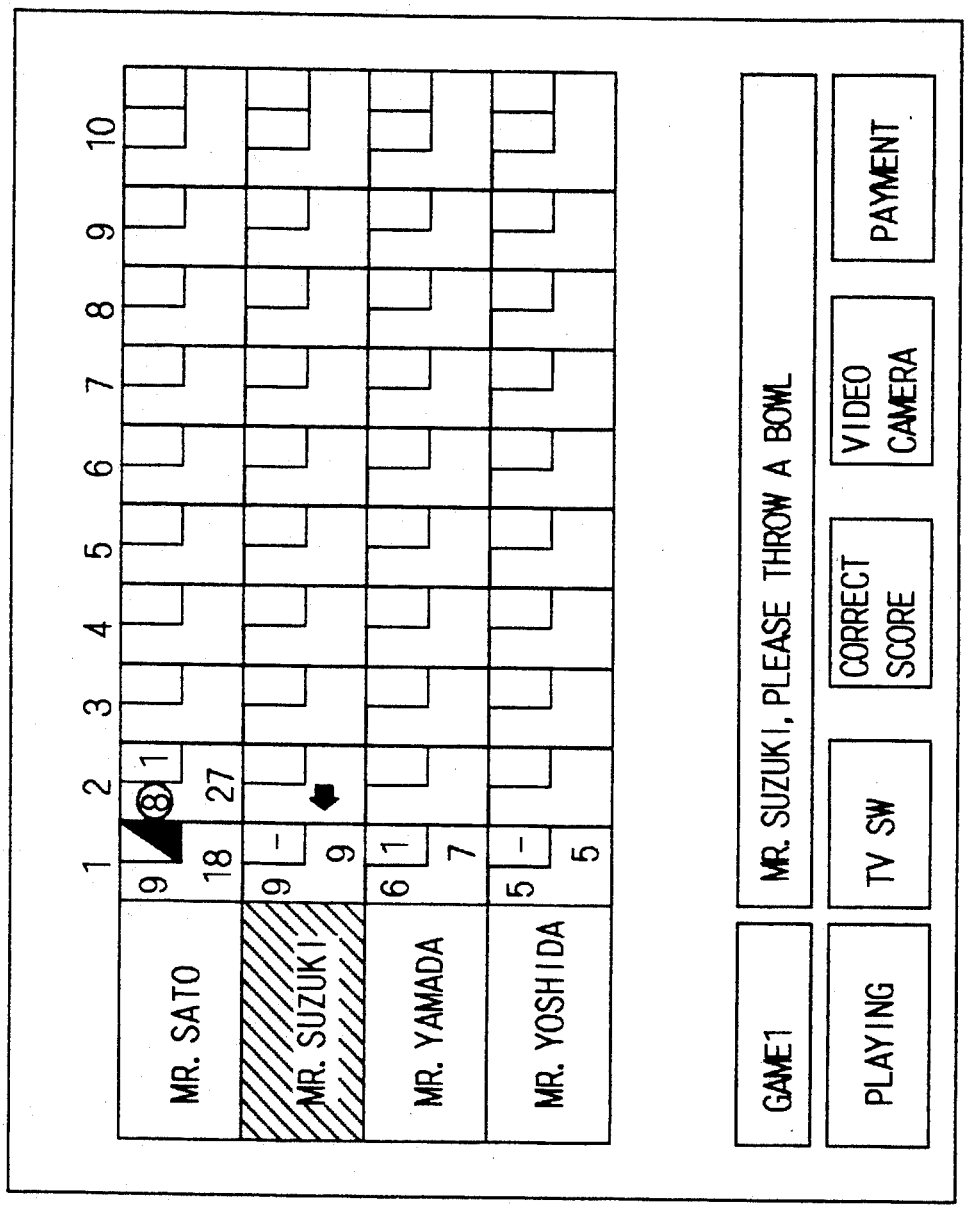
FIG. 23 shows a display example of players' scores.

FIG. 23 shows a display example of the players' scores.

FIGS. 24 to 32 are flowcharts showing a process of the micro computer provided in the console.

First, the scores for the players and various variables for the game are initialized (n101). Next, whether a frame is finished is judged and a calculation for the scoring is performed to display the scores as shown in FIG. 23 (n102). After that, the player's throwing form is displayed on the over-head CRT, and the bowl pass is waited (n103, n104). When the bowl is passed, the image signal by the pin video camera 40 is imparted to the over-head CRT to display the pin action therein (n105). After that, the fallen down pins are detected. If the throw result causes a turkey, double strikes, a strike, a spare, a gutter, a miss, or a foul, the mark according to the throw result is displayed with the score. Otherwise, not-fallen down pins are displayed (n106, n107). After that, the game displaying is performed as shown in FIG. 20, and the player's piece is advanced according to the sum of the fallen down pins and the voice output is done if there is need (n108). The game displaying is performed for the specified time, and then the score is displayed again (n108, n102, . . . ).

Figure 24:
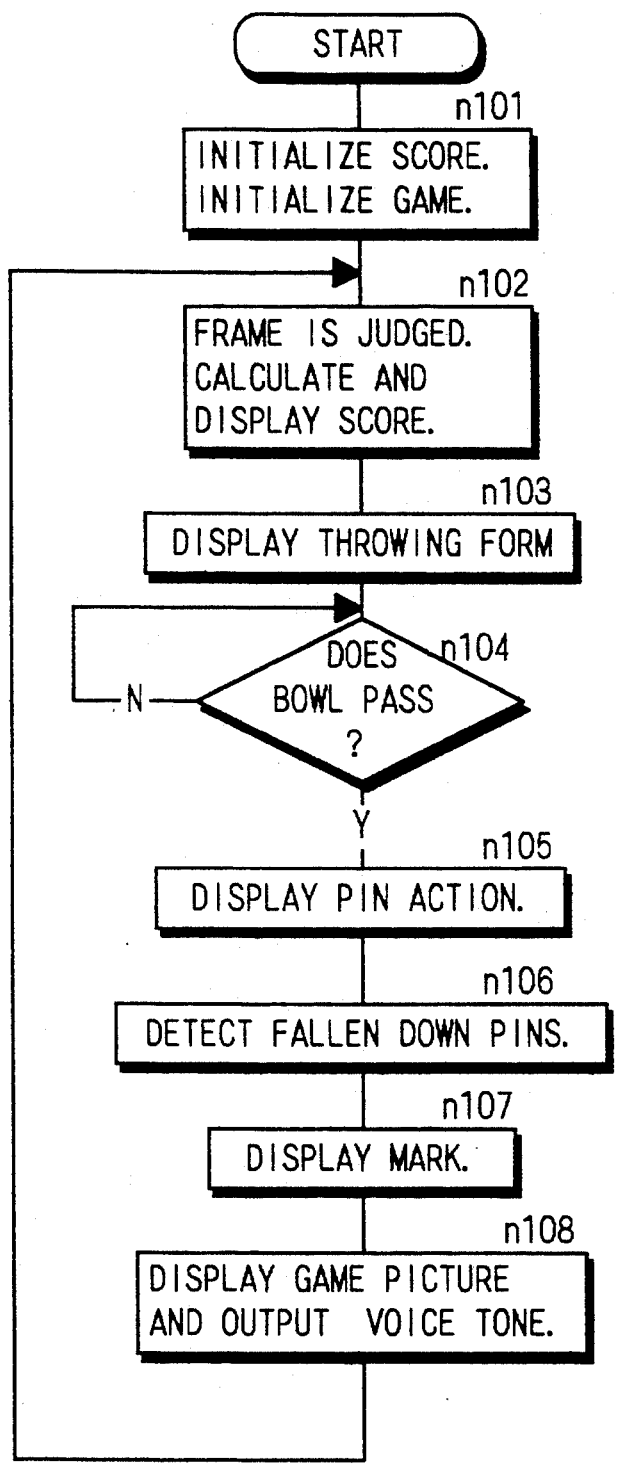
FIGS. 24 to 32 are flowcharts showing a process of a micro computer provided in a console.
Figure 25:
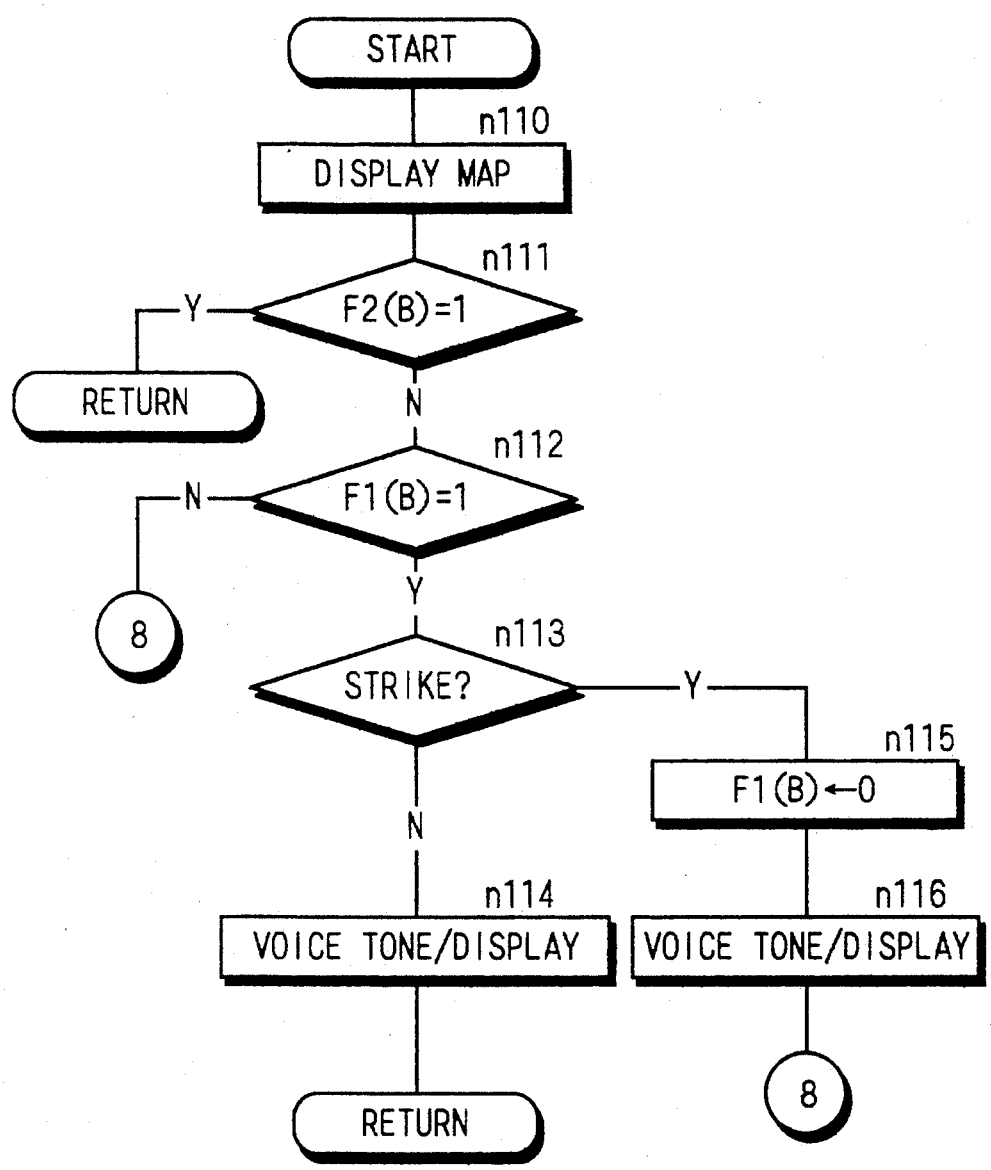
Figure 26:
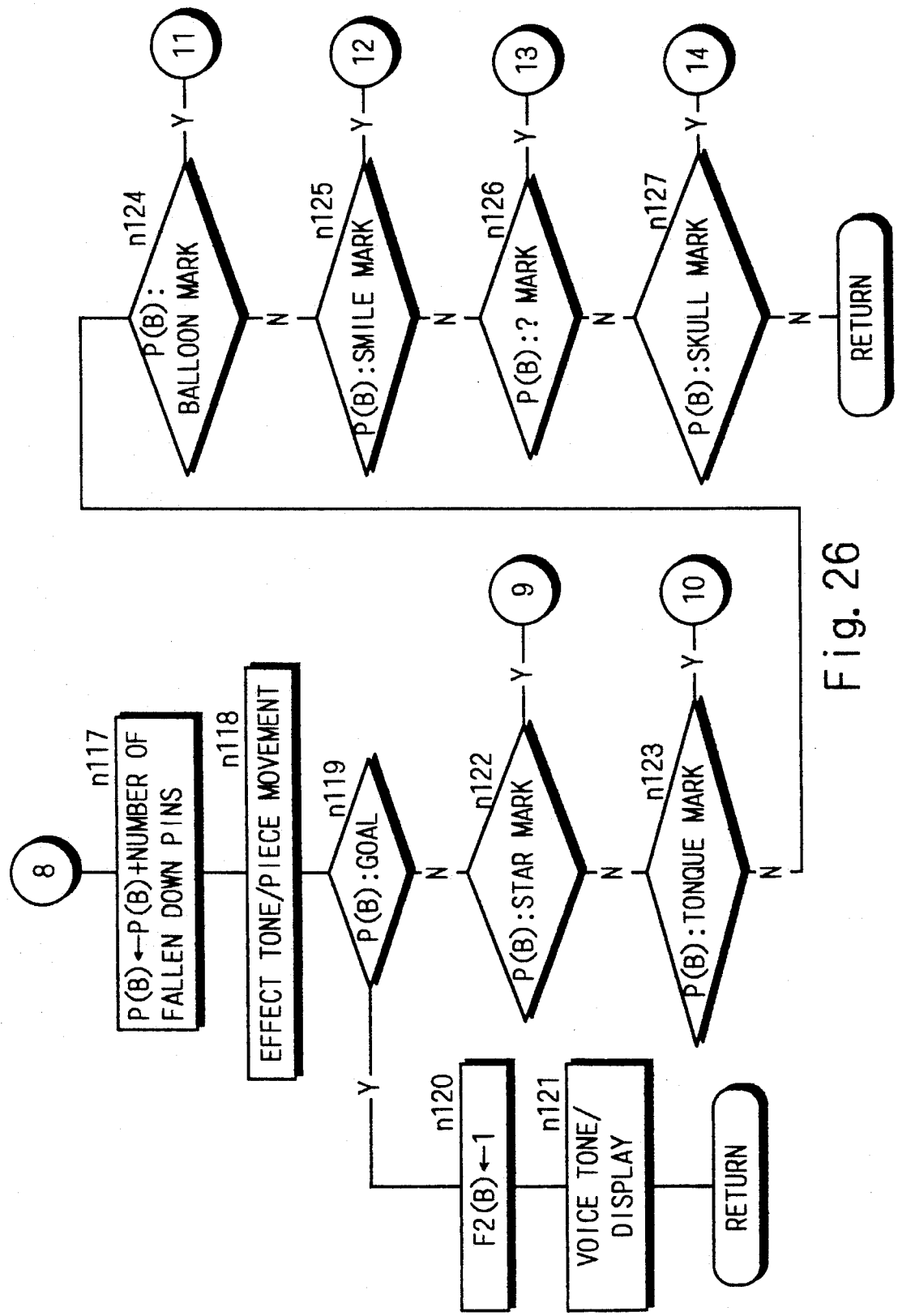

FIG. 25 is a flowchart of the step n108 in FIG. 24.

A variable "B" in the flowchart is a bowler's number, P(B) is a counter representing his piece location, F1(B) is a flag representing damage status, such as status that his piece can't be advanced unless a strike occurs next, which causes according to the game condition, and F2 (B) is a flag representing that his piece reaches a goal.

Figure 27:
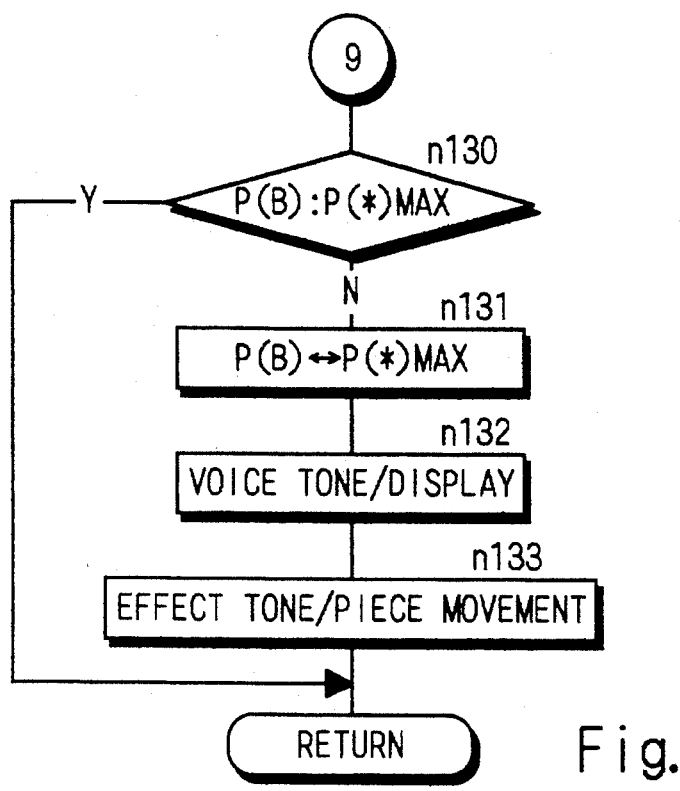

In the game process, the map (see FIG. 20) is displayed as shown in FIG. 25 (n110). If F2(B) isn't "1", i.e., the player's piece doesn't reach the goal, whether F1(B) is "1", i.e., whether the present status is such damage one that the piece can't be advanced unless the player gets a strike next, is judged (n112). If the status is normal (F1(B)="0"), the fallen down pins are added to the P(B), the piece is advanced, the effect tone with the advancing is generated, and the money in the player's hand displayed is updated (n112, n117, n118). Then, whether the piece enters one out of marks MA, MB, MC, MD, ME, MF and the goal MG is judged (n119 to n127). If the piece doesn't reach each mark, the process is ended. If the piece reaches the goal mark MG, the flag F2(B) is set and a specified voice massage is outputted. For example, the voice massage, "Wow, you have succeeded in kill of devils and rescue of a castle.", is outputted and the corresponding display is performed (n119, n120, n121). If the piece goes into the star mark MA, the process of FIG. 27 is performed, namely, the player's count value and his piece are replaced with the largest count value and it's piece of any other player (n130, n131). Here, P(*)max represents the largest count value. A voice message is outputted at a same time, and the pattern shown in FIG. 22 (C) is displayed on the map. Furthermore, the pattern is changed as an animation (n132). An effect tone is generated when the piece is replaced with another piece, the two piece locations in change are changed, and also the sum of money of them is changed (n133).

Figure 28:
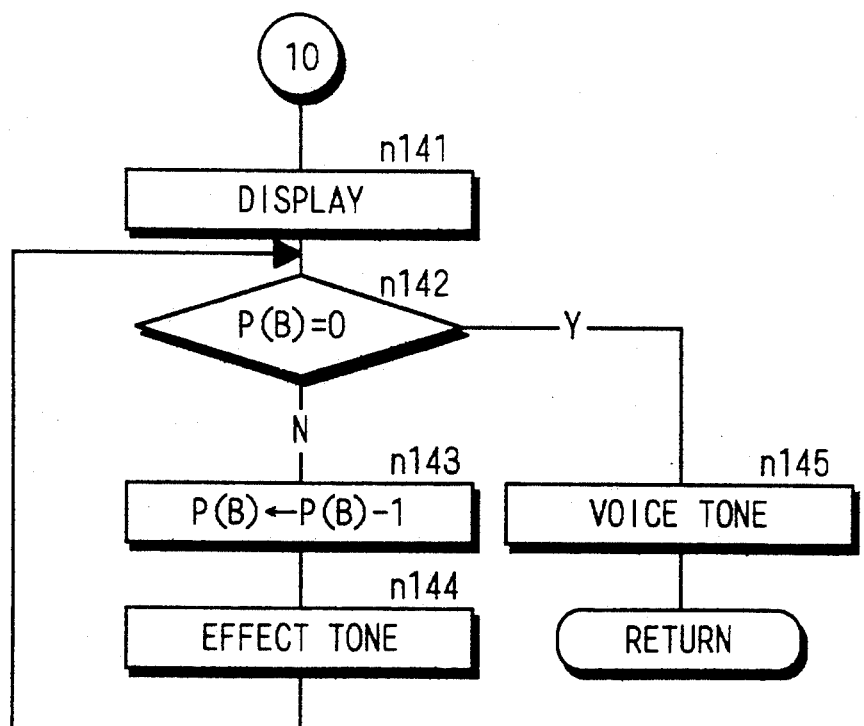
Figure 29:
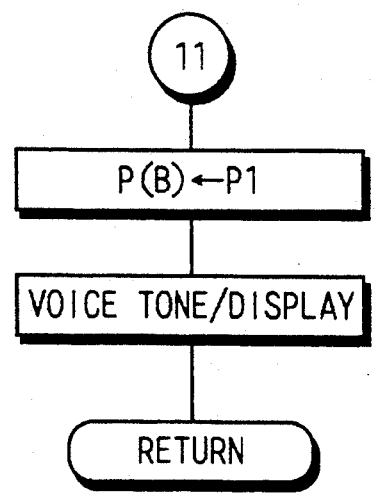
Figure 30:
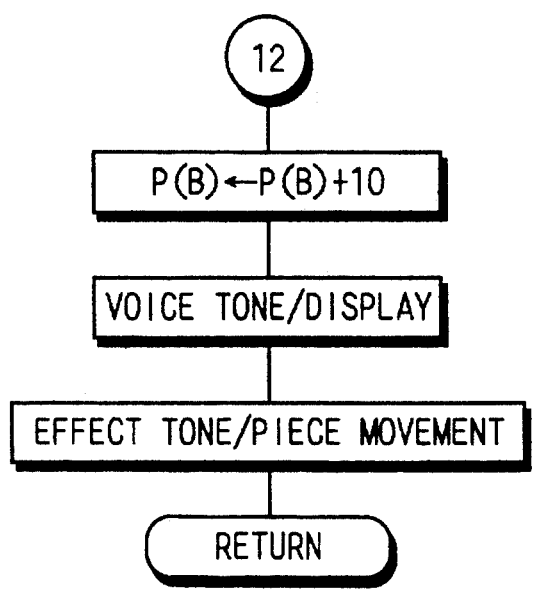
Figure 31:
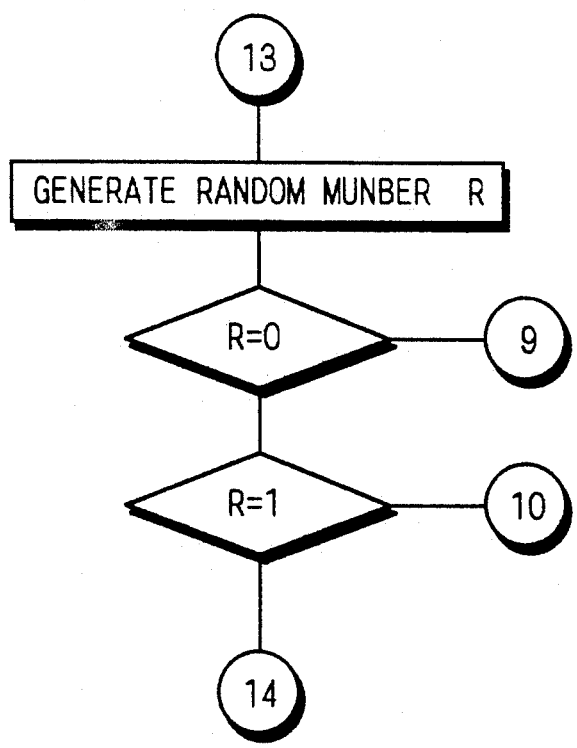
Figure 32:
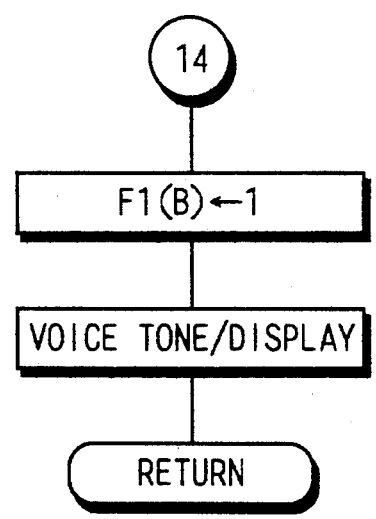

While, if the piece enters the mark MB in FIG. 20, the process is performed as shown in FIG. 28. First, the pattern shown in FIG. 22(E) is displayed on the map as an animation (n141). Next, the piece is returned to the start position with an effect tone successively (n142, n143, n144). When the piece is returned to the start position, a specified voice sound is generated (n145). If the piece enters the mark MC in FIG. 20, the process is performed as shown in FIG. 29. First, the piece is advanced by ten blocks, and a specified voice sound is outputted with animation displaying of the pattern of FIG. 22(B) (n160, n161). If the piece enters the mark ME in FIG. 20, the process is performed as shown in FIG. 31. First, the random number R (0, 1, or 2) is generated (n163), and the corresponding process to the random number R is performed (n164, n165). If the piece enters the mark MF, the process is performed as shown in FIG. 32. First, the flag F1 (B) is set, and a specified voice message is outputted (n112, n113, n114). If the strike occurs the flag F1 (B) is reset, and a specified voice message is outputted (n113, n115, n116, n117, . . . ).

As described above, each piece is advanced according to the sum of the number of the fallen down pins. Then the piece's movement and the player's money in his hand are modified depending on the mark that the piece enters.

What is claimed is:

1. An automatic bowling scoring system comprising:
 a first video camera for taking an image of player's throwing form;
 a second video camera for taking an image of pins;
 display means for displaying at least the image of the player's throwing form, the image of the pins and a specified color pin picture which is included in a ten-pin picture; and
 premium giving means for giving said player a predetermined premium when the specified color pin is knocked down by the player.

2. An automatic bowling scoring system according to claim 1, wherein said specified color is red.

3. An automatic bowling scoring system according to claim 1, wherein said display means includes small display means for displaying a score.

4. An automatic bowling scoring system according to claim 1, further comprising a plurality of consoles, one of which is provided for each lane, for processing data inputted from said first and second video cameras and outputted to said display means.

5. An automatic bowling scoring system according to claim 4, further comprising a host computer, which is connected to said plurality of consoles through lines, for processing data inputted from and outputted to the consoles.

6. An automatic bowling scoring system according to claim 1, further comprising spot light means for lighting a pin with a specified color light to cause display of said specified color pin picture on said display means.

7. An automatic bowling scoring system according to claim 6, wherein said pin is a first pin in the ten-pin group.

8. An automatic bowling scoring system according to claim 6, further comprising a random value generating means for generating a random value for each frame, wherein said spot light means lighting said pin with the specified color light when the random value becomes a specified one.

9. An automatic bowling scoring system comprising:
 a first video camera for taking an image of player's throwing form;
 a second video camera for taking an image of pins;
 display means for displaying at least the image of the player's throwing form, the image of the pins and a board game picture including a game board picture and a piece for said player; and
 premium giving means for giving said player piece advancing according to the number of the knocked down pins.

10. An automatic bowling scoring system according to claim 9 wherein the board game is parcheesi.

11. An automatic bowling scoring system according to claim 9, further comprising display control means for displaying a map, animations according to a location of said piece and said piece on said display means.

12. An automatic bowling scoring system according to claim 11, further comprising voice message generating means for generating voice messages according to an advance of said piece.

* * * * *